US012515850B2

(12) United States Patent
Luburic et al.

(10) Patent No.: US 12,515,850 B2
(45) Date of Patent: Jan. 6, 2026

(54) CONTAINER AND SEAL ASSEMBLY

(71) Applicant: BWAY CORPORATION, Atlanta, GA (US)

(72) Inventors: Frano Luburic, Costa Mesa, CA (US); John Homan, Naperville, IL (US)

(73) Assignee: BWAY CORPORATION, Oak Brook, IL (US)

(*) Notice: Subject to any disclaimer, the term of this patent is extended or adjusted under 35 U.S.C. 154(b) by 0 days.

(21) Appl. No.: 17/449,923

(22) Filed: Oct. 4, 2021

(65) Prior Publication Data

US 2022/0024652 A1 Jan. 27, 2022

Related U.S. Application Data

(63) Continuation-in-part of application No. 17/288,015, filed as application No. PCT/US2020/019973 on Feb.

(Continued)

(51) Int. Cl.

| | |
|---|---|
| ***B65D 43/02*** | (2006.01) |
| ***B44D 3/12*** | (2006.01) |
| ***B65D 21/02*** | (2006.01) |

(52) U.S. Cl.

CPC ....... *B65D 43/0206* (2013.01); *B65D 21/022* (2013.01); *B44D 3/127* (2013.01);

(Continued)

(58) Field of Classification Search

CPC .............. B65D 43/0206; B65D 21/022; B65D 2543/00092; B65D 2543/00296;

(Continued)

(56) References Cited

U.S. PATENT DOCUMENTS

| | | | |
|---|---|---|---|
| 606,838 | A | 7/1898 | Heins |
| 1,454,958 | A | 5/1923 | Davis |

(Continued)

FOREIGN PATENT DOCUMENTS

| | | | |
|---|---|---|---|
| CA | 1166190 | A | 4/1984 |
| CA | 1189023 | A | 6/1985 |

(Continued)

OTHER PUBLICATIONS

International Search Report and Written Opinion dated May 19, 2020 for International PCT Patent Application No. PCT/US20/019973.

(Continued)

*Primary Examiner* — Nathan J Jenness
*Assistant Examiner* — Eric C Baldrighi
(74) *Attorney, Agent, or Firm* — Michael Best & Friedrich LLP

(57) ABSTRACT

The present disclosure relates generally to containers and container lids. In at least one embodiment, the disclosed containers and container lids provide a liquid-tight seal with the inclusion of a separately attached ring that generally eliminates material-trapping seams. For example, in certain embodiments, a container and a container ring for attaching to the rim of the container is disclosed. In these embodiments, the container ring attaches to the rim of the container such that a liquid-tight vertical seal is formed, thereby reducing or eliminating material-trapping seams.

20 Claims, 13 Drawing Sheets

Related U.S. Application Data

26, 2020, application No. 17/449,923 is a continuation-in-part of application No. 17/288,017, filed as application No. PCT/US2020/019975 on Feb. 26, 2020, application No. 17/449,923 is a continuation-in-part of application No. 29/725,733, filed on Feb. 26, 2020, now Pat. No. Des. 933,324, and a continuation-in-part of application No. 29/725,734, filed on Feb. 26, 2020, now Pat. No. Des. 932,721.

(60) Provisional application No. 62/810,709, filed on Feb. 26, 2019.

(52) U.S. Cl.
CPC .............. *B65D 2543/00092* (2013.01); *B65D 2543/00296* (2013.01); *B65D 2543/00453* (2013.01); *B65D 2543/00629* (2013.01); *B65D 2543/00685* (2013.01); *B65D 2543/00731* (2013.01); *B65D 2543/00796* (2013.01); *B65D 2543/00972* (2013.01)

(58) Field of Classification Search
CPC ........... B65D 2543/00453; B65D 2543/00629; B65D 2543/00685; B65D 2543/00731; B65D 2543/00796; B65D 2543/00972; B65D 2543/00277; B65D 2543/00435; B65D 2543/005; B65D 2543/00537; B65D 2543/00555; B44D 3/127
USPC .......................................................... 220/790
See application file for complete search history.

(56) References Cited

U.S. PATENT DOCUMENTS 1,550,983 A 8/1925 Pratt
1,696,240 A 12/1928 Kircher, Jr.
1,759,274 A 5/1930 O'Brien et al.
2,196,614 A 4/1940 Spitz
2,611,508 A 9/1952 Brown
2,885,108 A 5/1959 Donoghue
3,080,090 A * 3/1963 Young ................ B65D 43/0212 D9/503
3,109,575 A 11/1963 Aldington
D207,356 S 4/1967 Mcormack
3,362,565 A 1/1968 Mccormick
3,696,962 A * 10/1972 Fehres .................. B65D 45/32 220/675
3,799,388 A * 3/1974 Knize ................ B65D 43/0218 220/240
3,814,277 A 6/1974 La et al.
3,913,785 A 10/1975 Pattershall
3,944,115 A 3/1976 Moonan et al.
3,977,563 A 8/1976 Holt
3,999,677 A 12/1976 Oberkircher
4,022,344 A 5/1977 Roamer
4,101,046 A 7/1978 Puntillo
4,125,204 A 11/1978 Klein
4,128,223 A 12/1978 Brownlee
4,145,789 A 3/1979 Morgan, Sr.
4,171,063 A 10/1979 Cloutier
4,176,768 A 12/1979 Ritter
4,210,258 A 7/1980 Von Holdt
4,228,916 A 10/1980 Weingardt
4,245,753 A 1/1981 Ellis
4,256,240 A * 3/1981 Woinarski .......... B65D 43/0212 206/508
4,279,358 A 7/1981 Jacobs
4,293,080 A 10/1981 Letica
4,308,970 A 1/1982 Von Holdt
4,353,476 A 10/1982 Cowgill
4,356,930 A 11/1982 Roper
4,375,948 A 3/1983 Von Holdt
4,378,895 A 4/1983 Woinarski
4,387,828 A 6/1983 Yates, Jr.
4,388,998 A * 6/1983 Underwood ......... B65D 43/021 220/780
4,397,404 A 8/1983 Blanchette
4,446,986 A 5/1984 Bowen
4,453,646 A * 6/1984 Harrild .................. B65D 51/20 220/270
4,458,825 A 7/1984 Holota
D277,646 S 2/1985 Jorgensen
D278,561 S 4/1985 Anderson
4,512,493 A 4/1985 Von Holdt
4,512,494 A 4/1985 Von Holdt
D278,800 S 5/1985 Bowen
4,518,094 A 5/1985 Kodman
4,518,097 A 5/1985 Milton
4,524,882 A 6/1985 Buc
4,530,442 A 7/1985 Vogel, Jr.
D280,038 S 8/1985 Anderson
4,606,474 A 8/1986 Dudzik
4,667,843 A 5/1987 Galer
4,674,644 A 6/1987 Jacobs
D296,421 S 6/1988 Rayner
D296,422 S 6/1988 Rayner
D296,423 S 6/1988 Rayner
D296,987 S 8/1988 Rayner
4,796,775 A 1/1989 Dudzik
4,799,603 A 1/1989 Dudzik
4,823,433 A 4/1989 Curtis
4,867,401 A 9/1989 Graff
4,887,735 A 12/1989 Dudzik
4,893,725 A 1/1990 Ball
4,895,269 A 1/1990 Cade
4,928,846 A 5/1990 Murrin, Jr.
D310,628 S 9/1990 Rayner
D312,157 S 11/1990 Sjolander
4,969,570 A 11/1990 Harvey, Sr.
D312,572 S 12/1990 Rayner
4,998,643 A 3/1991 Pradel
5,027,973 A 7/1991 Drogos
5,092,481 A 3/1992 Skelton
5,097,977 A 3/1992 Straub
5,125,530 A 6/1992 Straub
D329,597 S 9/1992 Gallagher
5,143,219 A * 9/1992 Yates, Jr. ........... B65D 21/0219 206/508
5,149,238 A 9/1992 Mceldowney
5,161,689 A 11/1992 Balson
5,172,822 A 12/1992 Defrance
5,181,626 A 1/1993 Daenen
5,186,329 A 2/1993 Fogelberg
D338,621 S 8/1993 Balson
D339,621 S 9/1993 Balson
5,251,781 A 10/1993 Skelton
5,261,551 A 11/1993 Watt
5,307,949 A 5/1994 Von Holdt, Jr.
5,406,668 A 4/1995 Goodhue
5,437,386 A 8/1995 Von Holdt
5,471,681 A 12/1995 Ferrini
5,494,352 A 2/1996 L'Estrange, Jr.
5,566,465 A 10/1996 Zoeliner
5,626,258 A 5/1997 Maiorino
5,626,319 A 5/1997 Fusillo
D380,434 S 7/1997 Chen
5,716,034 A 2/1998 Unkefer
5,806,709 A 9/1998 Marshall
5,967,363 A 10/1999 Allen
6,006,942 A * 12/1999 Morris, Sr. ........ B65D 21/0219 206/508
6,098,833 A * 8/2000 von Holdt, Sr. ... B65D 43/0256 220/659
6,170,691 B1 * 1/2001 Morris, Sr. ........ B65D 43/0231 206/508
6,179,158 B1 1/2001 Koda
6,189,725 B1 2/2001 Monico
6,244,559 B1 6/2001 Stanton
6,245,277 B1 6/2001 Diamond
6,250,494 B1 6/2001 Diamond
6,322,028 B1 11/2001 Fleckenstein

(56) References Cited

U.S. PATENT DOCUMENTS

D457,283 S 5/2002 Wayt
6,386,013 B1 5/2002 Werth
6,436,286 B1 8/2002 Scott
6,460,723 B2 10/2002 Nguyen
6,491,185 B1 12/2002 Azzarello
6,588,618 B1 7/2003 Davis
D485,404 S 1/2004 Del Prato
6,761,280 B2 7/2004 Zonker
D498,339 S 11/2004 Doelling
6,820,848 B1 11/2004 Adam
6,964,348 B2 11/2005 Breimon
D534,253 S 12/2006 Sandman
D537,598 S 2/2007 Moore
D548,393 S 8/2007 Smith
D558,419 S 12/2007 Zychlinski
D610,856 S 3/2010 Hoffman et al.
D633,991 S 3/2011 Nakagawa
D638,523 S 5/2011 Yoshida
D644,803 S 9/2011 Schmon et al.
D655,401 S 3/2012 Muramatsu
D659,334 S 5/2012 Runyons
8,181,819 B2 * 5/2012 Burney .............. B65D 43/0258 220/780
D665,491 S 8/2012 Goel
8,342,354 B2 * 1/2013 Letica ................ B65D 43/0212 206/508
D703,898 S 4/2014 Neu
8,695,846 B2 4/2014 Letica
D723,239 S 2/2015 Raschke
8,985,383 B2 3/2015 Campbell
D728,757 S 5/2015 Graham
9,085,404 B2 7/2015 Dunn
D743,513 S 11/2015 Yamagishi
D751,380 S 3/2016 Torrison
D751,381 S 3/2016 Torrison
D751,382 S 3/2016 Torrison
D751,383 S 3/2016 Torrison
9,382,048 B2 7/2016 Van De Klippe
D766,534 S 9/2016 Stravitz
D767,234 S 9/2016 Kirkland
D767,329 S 9/2016 Mock
D774,887 S 12/2016 Torrison et al.
D776,529 S 1/2017 Torrison et al.
9,573,183 B2 2/2017 Mcclung
D783,922 S 4/2017 Kirkland
9,662,929 B2 5/2017 Smith
9,694,972 B1 7/2017 Stravitz
9,834,376 B1 12/2017 Stravitz
D813,483 S 3/2018 Foss et al.
D814,317 S 4/2018 Ehrlich et al.
D816,500 S 5/2018 Torrison et al.
D828,753 S 9/2018 Zabaleta
D830,434 S 10/2018 Wakisaka et al.
D830,435 S 10/2018 Wakisaka
D836,873 S 12/2018 Schneider
D844,921 S 4/2019 Schneider
10,543,964 B2 1/2020 Mortensen
D888,903 S 6/2020 Gunther
D891,174 S 7/2020 Cheng
D896,353 S 9/2020 Nakagawa
D914,870 S 3/2021 Zhang et al.
D916,590 S 4/2021 Albright
D917,281 S 4/2021 Will et al.
D917,282 S 4/2021 Albright et al.
D917,283 S 4/2021 Albright et al.
D917,284 S 4/2021 Albright et al.
D917,825 S 4/2021 Kirkland
D918,515 S 5/2021 Xie
D932,721 S 10/2021 Luburic et al.
D932,893 S 10/2021 Van De Klippe
D933,324 S 10/2021 Uburic et al.
D941,544 S 1/2022 Luburic et al.
D942,724 S 2/2022 Luburic et al.
2002/0175172 A1 * 11/2002 Diesterbeck ....... B65D 43/0212 220/795
2003/0168465 A1 9/2003 Breimon et al.
2004/0173718 A1 9/2004 Song
2005/0016887 A1 1/2005 Yewdall et al.
2005/0133517 A1 6/2005 Jackson
2005/0133518 A1 6/2005 Chornenky
2006/0043095 A1 3/2006 Maholm
2006/0113310 A1 6/2006 Hawkins
2006/0243733 A1 11/2006 Kline et al.
2006/0243736 A1 11/2006 Kline et al.
2006/0261067 A1 11/2006 Letica
2007/0221531 A1 9/2007 Coughlin
2007/0221675 A1 9/2007 Bootz
2008/0017651 A1 1/2008 Walker et al.
2008/0185383 A1 8/2008 Philippe
2008/0190803 A1 8/2008 Blumenschein
2008/0272133 A1 11/2008 Chornenky
2009/0032542 A1 2/2009 Temple
2009/0314780 A1 * 12/2009 Selina ................ B65D 43/0256 220/780
2010/0108705 A1 5/2010 De Jesus
2010/0229689 A1 9/2010 Minnette
2011/0000912 A1 1/2011 Roeterdink
2011/0036843 A1 2/2011 Letica
2011/0186572 A1 * 8/2011 Ciccone ............. B65D 43/0254 220/212.5
2013/0048657 A1 2/2013 Heiser, Jr.
2013/0075413 A1 3/2013 Letica
2013/0098925 A1 4/2013 Dunwoody
2013/0146609 A1 6/2013 Campbell
2013/0182526 A1 7/2013 Dertina, Sr.
2013/0341342 A1 12/2013 Campbell
2014/0076899 A1 3/2014 Ciccone
2014/0263304 A1 9/2014 Guertin
2015/0102034 A1 4/2015 Hutt
2016/0280423 A1 9/2016 Luburic
2016/0311584 A1 10/2016 Van Oosten
2017/0253415 A1 9/2017 Schneider
2017/0313477 A1 11/2017 Slack
2019/0283938 A1 9/2019 Strachan
2020/0016923 A1 1/2020 Lewan
2021/0031558 A1 2/2021 Mazur
2022/0363090 A1 11/2022 LeWan
2023/0105295 A1 4/2023 Simmons

FOREIGN PATENT DOCUMENTS

CA 2383732 A1 10/2002
CA 3045111 A1 5/2018
CN 1094368 A 11/1994
CN 1118325 A 3/1996
CN 1422224 A 6/2003
CN 104540745 A 4/2015
DE 20206170 U1 * 8/2002 .............. A47J 47/18
EP 0132897 A2 2/1985
EP 0278581 A2 8/1988
EP 0455172 4/1991
EP 0736460 A1 10/1996
FR 2702419 A1 9/1994
GB 522566 A 6/1940
GB 0724913 1/2008
GB 2445109 A * 6/2008 ......... B65D 43/0206
NO 146806 B * 9/1982 ............. B65D 45/32
WO WO-8805015 A * 7/1988 ......... B65D 43/0252
WO 2004002845 A1 1/2004
WO WO-2016075458 A1 * 5/2016 ............. B44D 3/128
WO 2018030963 A1 2/2018
WO 2018098454 A1 5/2018

OTHER PUBLICATIONS

International Search Report and Written Opinion dated May 22, 2020 for International PCT Patent Application No. PCT/US20/019975.

Plastic Paint Can; http://www.thecarycompany.com/plastic-paint-cans-30wkpb?utm_source=google_shopping&gclid=EAlalQobChMi_cjGk9Hq8AIVEv2zCh1J_AwHEAQYAIABEglod7_D_BwE (Year: 2019).

(56) References Cited

OTHER PUBLICATIONS

Black Paint Can; http://www.amazon.com/Gallon-Plastic-All-Plastic-Snap-tight-Varnishes/dp/B075NMJ39V (Year: 2018).
Container Rings; http://topwillgroup.com/stainless-steel-container-rings-products/ (Year: 2021).
Extended European Search Report for European Application No. 20762404.0, mailed Dec. 12, 2022, 7 Pages.
International Preliminary Report on Patentability for International Application No. PCT/US2020/019973, mailed Sep. 10, 2021, 8 Pages.
International Preliminary Report on Patentability for International Application No. PCT/US2020/019975, mailed Sep. 10, 2021, 9 Pages.
Notice of Allowance for U.S. Appl. No. 29/789,609, mailed Aug. 22, 2023, 06 Pages.
Final Office Action for U.S. Appl. No. 17/288,015, mailed Jan. 16, 2024, 21 Pages.
Notice of Allowance for U.S. Appl. No. 29/789,610, mailed Oct. 17, 2023, 3 Pages.
Extended European Search Report for European Application No. 20200762889, mailed Sep. 12, 2023, 8 Pages.
Final Office Action for U.S. Appl. No. 17/288,017, mailed Sep. 20, 2023, 18 Pages.
Notice of Allowance for U.S. Appl. No. 29/789,610, mailed Sep. 19, 2023, 6 Pages.
Non-Final Office Action for U.S. Appl. No. 17/288,017, mailed Apr. 16, 2024, 21 Pages.
Australian Patent Office. Examination Report No. 1 for Application No. 2020229837, dated Feb. 25, 2025 (3 pages).
Australian Patent Office. Examination Report No. 1 for Application No. 2020229829, dated Feb. 25, 2025 (4 pages).
European Patent Office. Extended European Search Report for Application No. 24217149.4, dated Apr. 29, 2025 (9 pages).
Brazilian Patent Office. Technical Examination Report for Application No. BR112021016441-3, dated May 6, 2025 (8 pages with machine translation).
Malaysian Patent Office, Office Action and Search Report for Application No. PI2021004577, dated Jun. 5, 2025 (7 pages).

* cited by examiner

CONTAINER AND SEAL ASSEMBLY

CROSS REFERENCE TO RELATED APPLICATIONS

This application is a continuation-in-part application of. U.S. patent application Ser. No. 17/288,015, entitled "Container and Seal Assembly," filed Apr. 23, 2021, which is a 371 National Stage Application of International Patent Application No. PCT/US20/19973, filed on Feb. 26, 2020, and entitled "Container and Seal Assembly," which claims priority to, and the benefit under 35 U.S.C. § 119 of, U.S. Provisional Patent Application No. 62/810,709, filed Feb. 26, 2019, and entitled "TWO PIECE CONTAINER";

U.S. patent application Ser. No. 17/288,017, entitled "Improved Three-Piece Container Assembly," filed Apr. 23, 2021, which is a 371 National Stage Application of International Patent Application No. PCT/US20/19975, filed on Feb. 26, 2020, and entitled "Improved Three-Piece Container Assembly," which claims priority to, and the benefit under 35 U.S.C. § 119 of, U.S. Provisional Patent Application No. 62/810,709, filed Feb. 26, 2019, and entitled "TWO PIECE CONTAINER";

U.S. Design patent application No. 29/725,733, entitled "Container," filed Feb. 26, 2020, now U.S. Pat. No. D.933,324; and U.S. Design patent application No. 29/725,734, entitled "Container Ring," filed Feb. 26, 2020, now U.S. Pat. No. D.932,721, each of which are hereby incorporated by reference herein as if set forth in their entireties.

This application is also related to and hereby incorporates by reference the following U.S. patent applications:

U.S. Design patent application No. 29/725,732, entitled "CONTAINER," filed on Feb. 26, 2020; and U.S. Design patent application No. 29/725,731, entitled "CONTAINER LID," filed on Feb. 26, 2020.

TECHNICAL FIELD

The present disclosure relates generally to containers and container lids.

BACKGROUND

Containers are a widely used component in a variety of industries. Wholesalers, merchants, and individuals use containers in a plethora of industries including, but not limited to: manufacturing, agriculture, beverage, entertainment, health care, food services, hospitality, fishing, retail, automotive, transportation, waste management, oil and gas, education, and construction. The paint industry in particular, as a liquid-based industry, heavily depends on containers for the majority of its packing, storing, and shipping requirements. As such, improvements to paint and other liquid-carrying containers may account for significant cost savings to a company's bottom line.

As an initial matter, containers and lids can include inadequate sealing mechanisms that allow leakage and air intake. Further, in some applications, traditional containers tend to permit waste, as paint or other liquids often become trapped in various joints or seams of the container. Therefore, there is a long-felt but unresolved need for containers and lids, having a design that provides an improved sealing structure that provides a liquid-tight seal and limits the amount of product that may become trapped in various joints or seams of the container.

BRIEF SUMMARY OF DISCLOSURE

Briefly described and according to one embodiment, aspects of the present disclosure relate generally to containers and container lids, and more particularly to containers including a separate container ring and associated container lids. The present disclosure discusses a novel and unique container that provides several improvements over existing, traditional containers in the paint and other liquid-based industries. In various embodiments, the containers discussed herein increase product retention and are lower cost than traditional containers for storing similar goods. In at least one embodiment, the present container includes a separate container ring, which, in combination with the container design, may substantially eliminate one or more seams within the container (e.g., the combination of the container and ring). In this embodiment (and others), the present container may prevent product stored therein from being trapped in the one or more eliminated seams. Substantially eliminating one or more content-trapping seams may preserve original color content of tinted paint (e.g., by preventing tinted/coloring from being trapped in the seam) and enable a consumer to pour all paint/content out of the container such that no paint/content is left trapped within a joint or seam. As will be understood, a design that allows a consumer/user to pour out all paint/content may make such a container easier and/or less expensive to recycle.

Additionally, in particular embodiments, and as will be discussed herein, the present container is manufactured from plastic, as opposed to traditional containers manufactured from metal, such that production expenses may be decreased and container longevity may be increased.

According to a first aspect, the seal ring may include: A) an outer sidewall including: 1) an exterior outer sidewall surface including a substantially arcuate portion for interfacing with a corresponding semi-circular bead of a sidewall of a container in an attached configuration; 2) a top surface; 3) an upper portion outer surface substantially perpendicular to the top surface; and 4) a upper portion bottom surface substantially parallel to the top surface and perpendicular to the outer surface; B) a generally hook-shaped aperture including: 1) an aperture surface substantially parallel to the upper portion outer surface and intersecting with the upper portion bottom surface; and 2) an undercut surface substantially perpendicular to the aperture surface, wherein the undercut surface is configured to interface with a corresponding surface on the container in the attached configuration; C) an inner sidewall forming a seal structure for sealing an interior cavity of the container with a lid; and D) a floor connecting the inner sidewall and the outer sidewall.

According to a second aspect, the container may include the container of the first aspect or any other aspect, wherein the substantially arcuate portion of the exterior outer sidewall surface transitions to an exterior floor surface, the exterior floor surface substantially parallel to the upper portion outer surface.

According to a third aspect, the container may include the container of the second aspect or any other aspect, wherein the generally hook-shaped aperture and the substantially arcuate portion of the exterior outer sidewall surface seals the seal ring with the container in the attached configuration.

According to a fourth aspect, the container may include the container of the first aspect or any other aspect, wherein the floor slopes downwardly from the inner sidewall to the outer sidewall.

According to a fifth aspect, the container may include the container of the first aspect or any other aspect, wherein the top surface transitions to an interior outer sidewall surface via a vertical wall substantially perpendicular to the top surface.

According to a sixth aspect, the container may include the container of the fifth aspect or any other aspect, wherein the outer sidewall and the inner sidewall form a generally u-shaped channel for receiving the lid for sealing the interior cavity of the container.

According to a seventh aspect, the container may include the container of the first aspect or any other aspect, wherein the inner sidewall includes: A) an inner seal surface; B) a substantially flat outer seal surface; and C) a ring bead integrally formed with the inner seal surface and extending from the inner seal surface toward an interior outer sidewall surface for engaging with a corresponding structure on the lid.

According to a eighth aspect, the container may include the container of the seventh aspect or any other aspect, wherein the ring bead includes an upper ring bead slope and a lower ring bead slope, the upper ring bead slope and lower ring bead slope culminating in a ring bead peak.

According to a ninth aspect, the container may include the container of the seventh aspect or any other aspect, wherein the inner seal surface and the substantially flat outer seal surface converge at a seal surface peak.

According to a tenth aspect, the container may include the container of the seventh aspect or any other aspect, wherein the substantially flat outer seal surface includes a seal ring notch for receiving a correspondingly shaped structure on a lid.

According to an eleventh aspect, the container may include the container of the tenth aspect or any other aspect, wherein the seal ring notch is positioned substantially opposite the ring bead.

According to a twelfth aspect, the container may include the container of the eleventh aspect or any other aspect, wherein the seal ring notch is substantially triangular, rectangular, or rounded.

According to a thirteenth aspect, the container may include the container of the first aspect or any other aspect, wherein the seal ring is plastic.

According to a fourteenth aspect, the container may include a container body including a bottom and an external wall extending from the bottom and defining an interior cavity, the external wall: A) including an exterior wall surface; B) terminating in a container rim area including: 1) a latch surface extending outwardly from the exterior wall surface; and 2) a semi-circular bead; and C) a seal ring attached to the container rim area and including: 1) an outer sidewall including: a) an exterior outer sidewall surface comprising a substantially arcuate portion interfacing with the semi-circular bead of the container rim area; b) a top surface; c) an upper portion outer surface substantially perpendicular to the top surface; d) a upper portion bottom surface substantially parallel to the top surface and perpendicular to the outer surface; e) a generally hook-shaped aperture including: i) an aperture surface substantially parallel to the upper portion outer surface and intersecting with the upper portion bottom surface; and ii) an undercut surface substantially perpendicular to the aperture surface, wherein the undercut surface interfaces with the latch surface of the container rim area; 2) an inner sidewall forming a seal structure for sealing the interior cavity of the container body with a lid; and 3) a floor connecting the inner sidewall and the outer sidewall.

According to a fifteenth aspect, the container may include the container of the fourteenth aspect or any other aspect, wherein the substantially arcuate portion of the exterior outer sidewall surface transitions to an exterior floor surface, the exterior floor surface substantially parallel to the upper portion outer surface and to the exterior wall surface of the container body.

According to a sixteenth aspect, the container may include the container of the fifteenth aspect or any other aspect, wherein the generally hook-shaped aperture, the substantially arcuate portion of the exterior outer sidewall, and the exterior floor surface seals the seal ring with the container.

According to a seventeenth aspect, the container may include the container of the fourteenth aspect or any other aspect, wherein the floor slopes downwardly from the inner sidewall to the outer sidewall.

According to an eighteenth aspect, the container may include the container of the fourteenth aspect or any other aspect, wherein the top surface transitions to an interior outer sidewall surface via a vertical wall substantially perpendicular to the top surface.

According to a nineteenth aspect, the container may include the container of the fourteenth aspect or any other aspect, wherein the outer sidewall and the inner sidewall form a generally u-shaped channel for receiving the lid for sealing the interior cavity of the container body.

According to a twentieth aspect, the container may include the container of the fourteenth aspect or any other aspect, wherein the inner sidewall includes: A) an inner seal surface; B) a substantially flat outer seal surface; and C) a ring bead integrally formed with the inner seal surface and extending from the inner seal surface toward an interior outer sidewall surface for engaging with a corresponding structure on the lid.

According to a twenty-first aspect, the container may include the container of the twentieth aspect or any other aspect, wherein the ring bead includes an upper ring bead slope and a lower ring bead slope, the upper ring bead slope and lower ring bead slope culminating in a ring bead peak.

According to a twenty-second aspect, the container may include the container of the twenty-first aspect or any other aspect, wherein the inner seal surface and the substantially flat outer seal surface converge at a seal surface peak.

According to a twenty-third aspect, the container may include the container of the twenty-second aspect or any other aspect, wherein the substantially flat outer seal surface includes a seal ring notch for receiving a correspondingly shaped structure on the lid.

According to a twenty-fourth aspect, the container may include the container of the twenty-third aspect or any other aspect, wherein the seal ring notch is positioned substantially opposite the ring bead.

According to a twenty-fifth aspect, the container may include the container of the twenty-fourth aspect or any other aspect, wherein the seal ring notch is substantially triangular, rectangular, or rounded.

According to a twenty-sixth aspect, the container may include the container of the fourteenth aspect or any other aspect, wherein the container body and the seal ring are plastic.

According to a twenty-seventh aspect, the container may include the container of the fourteenth aspect or any other aspect, wherein the container includes the lid.

According to a twenty-eighth aspect, the seal ring may include: A) an outer sidewall including: 1) an arcuate portion for interfacing with a corresponding semi-circular bead of a sidewall of a container in an attached configuration including a first thickness; 2) a hook-shaped aperture; and 3) a seal ring protrusion for engaging with the semi-circular bead in an attached configuration, the seal ring protrusion opposite an undercut surface of the hook-shaped aperture; B) a bottom surface sloping downwardly from an inner sidewall to the outer sidewall; C) a lower seal structure for engaging with a corresponding u-shaped crevice on a container and including: 1) a lower portion of the outer sidewall including a second thickness greater than the first thickness of the arcuate portion of the outer sidewall; 2) a cavity defined by the bottom structure and including: a) a first surface interfacing with a surface of the lower portion of the outer sidewall; b) a second surface forming a rounded transition to a bottom surface of the bottom structure; and c) an upper interior surface; and 3) a latch portion defined by the lower portion of the outer sidewall and the cavity.

According to a twenty-ninth aspect, the seal ring may include the seal ring of the twenty-eighth aspect or any other aspect, wherein a width of the cavity is between 0.75 cm and 1.5 cm.

According to a thirtieth aspect, the seal ring may include the seal ring of the twenty-ninth aspect or any other aspect, wherein the bottom surface slopes downwardly at an angle between 100 degrees and 130 degrees from the inner sidewall.

According to a thirty-first aspect, the seal ring may include the seal ring of the thirtieth aspect or any other aspect, wherein the inner sidewall includes a ring bead for engaging with a corresponding component on a container lid, wherein the ring bead includes a protrusion perpendicular to the inner sidewall.

According to a thirty-second aspect, the seal ring may include the seal ring of the thirty-first aspect or any other aspect, wherein the ring bead is trapezoidal in shape and further includes: A) a front surface, wherein the front surface is parallel to an interior surface of the inner sidewall; B) a top surface, wherein the top surface slopes downwardly from the interior surface of the inner sidewall to the front surface; and C) a bottom surface, wherein the bottom surface slopes downwardly from the front surface to the interior surface of the inner sidewall.

According to a thirty-third aspect, the seal ring may include the seal ring of the thirty-second aspect or any other aspect, wherein the distance between the seal ring protrusion and the undercut surface is between 0.25 cm and 1.5 cm.

According to a thirty-fourth aspect, the seal ring may include the seal ring of the thirty-third aspect or any other aspect, wherein the hook-shaped aperture, the seal ring protrusion, the arcuate portion, and the lower seal structure seal the ring with the container in an attached configuration.

According to a thirty-fifth aspect, the seal ring may include the seal ring of the thirty-fourth aspect or any other aspect, wherein the seal ring is plastic.

According to a thirty-sixth aspect, the seal ring may include: A) an outer sidewall including: 1) an arcuate portion for interfacing with a corresponding semi-circular bead of a sidewall of a container in an attached configuration including a first thickness; 2) a hook-shaped aperture; and 3) a seal ring protrusion for engaging with the semi-circular bead in an attached configuration, the seal ring protrusion opposite an undercut surface of the hook-shaped aperture; B) an inner sidewall including a ring bead for engaging with a corresponding component on a container lid; C) a bottom surface sloping downwardly from the inner sidewall to the outer sidewall; D) a lower seal structure for engaging with a corresponding u-shaped crevice on a container and including: 1) a lower portion of the outer sidewall including a second thickness greater than the first thickness of the arcuate portion of the outer sidewall; 2) a cavity defined by the bottom structure and including: a) a first surface interfacing with a surface of the lower portion of the outer sidewall; b) a second surface forming a rounded transition to a bottom surface of the bottom structure; and c) an upper interior surface; and 3) a latch portion defined by the lower portion of the outer sidewall and the cavity.

According to a thirty-seventh aspect, the seal ring may include the seal ring of the thirty-sixth aspect or any other aspect, wherein a width of the cavity is between 0.75 cm and 1.5 cm.

According to a thirty-eighth aspect, the seal ring may include the seal ring of the thirty-seventh aspect or any other aspect, wherein the bottom surface slopes downwardly at an angle between 100 degrees and 130 degrees from the inner sidewall.

According to a thirty-ninth aspect, the seal ring may include the seal ring of the thirty-eighth aspect or any other aspect, wherein the ring bead includes a protrusion perpendicular to the inner sidewall.

According to a fortieth aspect, the seal ring may include the seal ring of the thirty-ninth aspect or any other aspect, wherein the ring bead is trapezoidal in shape and further includes: A) a front surface, wherein the front surface is parallel to an interior surface of the inner sidewall; B) a top surface, wherein the top surface slopes downwardly from the interior surface of the inner sidewall to the front surface; and C) a bottom surface, wherein the bottom surface slopes downwardly from the front surface to the interior surface of the inner sidewall.

According to a forty-first aspect, the seal ring may include the seal ring of the fortieth aspect or any other aspect, wherein the distance between the seal ring protrusion and the undercut surface is between 0.25 cm and 1.5 cm.

According to a forty-second aspect, the seal ring may include the seal ring of the forty-first aspect or any other aspect, wherein the hook-shaped aperture, the seal ring protrusion, the arcuate portion, and the lower seal structure seal the ring with the container in an attached configuration.

According to a forty-third aspect, the seal ring may include the seal ring of the forty-second aspect or any other aspect, wherein the seal ring is plastic.

According to a forty-fourth aspect, the container may include: a container body including a bottom and an external wall extending from the bottom to an upper end and defining an interior cavity, the external wall including: A) an exterior wall surface; B) a container rim area proximate the upper end and including: 1) a latch surface extending outwardly from the exterior wall surface; and 2) a semi-circular bead formed by an interior wall surface; and C) a ledge area below the container rim area, the ledge area integrally formed with the exterior wall and defining a u-shaped crevice for engaging with a corresponding lower seal structure of a seal ring; and the seal ring including: A) an outer sidewall including: 1) an arcuate portion for interfacing with the semi-circular bead of the interior wall surface of the container in an attached configuration; and 2) a seal ring protrusion for engaging with the semi-circular bead in the attached configuration; B) an inner sidewall forming a seal structure for sealing the interior cavity of the container with a lid; and C) a lower seal structure for engaging with the u-shaped crevice on the container and including: 1) a cavity; and 2) a latch portion defined by the outer sidewall and the cavity.

According to a forty-fifth aspect, the container may include the container of the forty-forth aspect or any other aspect, wherein: A) the arcuate portion of the outer sidewall includes a first thickness; and B) a lower portion of the outer sidewall includes a second thickness greater than the first thickness of the arcuate portion of the outer sidewall.

According to a forty-sixth aspect, the container may include the container of the forty-fifth aspect or any other aspect, wherein the seal ring includes: A) a hook-shaped aperture; and B) a seal ring protrusion for engaging with the semi-circular bead in an attached configuration, the seal ring protrusion opposite an undercut surface of the hook-shaped aperture.

According to a forty-seventh aspect, the container may include the container of the forty-sixth aspect or any other aspect, wherein the interior wall seal structure includes a ring bead for engaging with a corresponding component on the lid for sealing the interior cavity of the container.

These and other aspects, features, and benefits of the claimed embodiment(s) will become apparent from the following detailed written description of the embodiments and aspects taken in conjunction with the following drawings, although variations and modifications thereto may be effected without departing from the spirit and scope of the novel concepts of the disclosure.

BRIEF DESCRIPTION OF THE DRAWINGS

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein.

DETAILED DESCRIPTION

Figure 1:
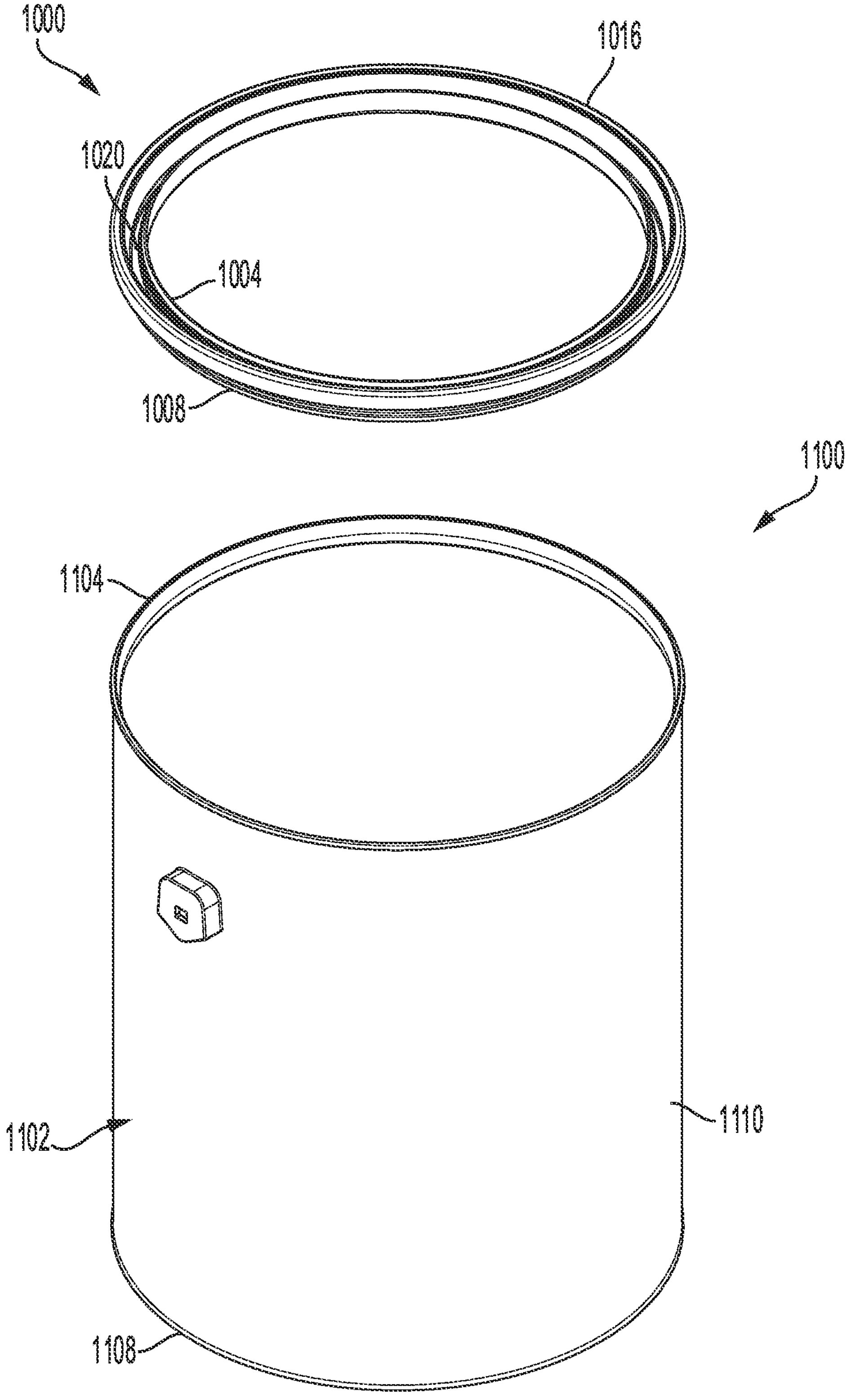
FIG. 1 is an exploded view of an exemplary container and container ring, according to one embodiment of the present disclosure.

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with, and as expressed in the claims.

Whether a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. However, the capitalization or lack thereof within the remainder of this document is not intended to be necessarily limiting unless the context clearly indicates that such limitation is intended.

Overview

The above and further features of the disclosed exemplary container, container ring, and container lid will be recognized from the following detailed descriptions and drawings of particular embodiments. In various embodiments, a container with a rim is disclosed. In particular embodiments, the container includes a container body (e.g., external wall) that forms the outer casing of the container. In some embodiments, the container includes bail ear assemblies to provide a mechanism for attaching a handle to the container. According to at least one embodiment, the container includes a bottom panel to provide stability and support for the container as well as an encasing for material stored in the container. In particular embodiments, the container (e.g., the container rim) includes one or more seal surfaces to provide enhanced sealing properties when engaged with a container ring and sealed with a container lid.

In at least one embodiment, a container ring is disclosed for engaging with a container and container lid. In some embodiments, the container ring includes a u-shaped channel. In particular embodiments, the container ring includes one or more sidewalls including one or more seal surfaces for facilitating a liquid-tight seal when engaged with a container and/or container lid. In some embodiments, the container ring includes a ring bead for engaging with a corresponding structure on a container lid. In certain embodiments, the container ring includes an outer sidewall including a hook-shaped aperture for attaching to the container rim of a container. According to at least one embodiment, the container ring is circular in shape. In at least one embodiment, the container ring is square or rectangular in shape.

Furthermore, a container lid is disclosed for engaging with a container ring. In various embodiments, the container lid includes one or more seal surfaces to provide enhanced sealing properties when sealing a container (e.g., container ring). In particular embodiments, the container lid includes an undercut for engaging with a corresponding ring bead on a container ring to facilitate a liquid-tight seal. In one or more embodiments, the container lid may be manufactured to fit any container shape (e.g., rectangular, ovoid, etc.). According to at least one embodiment, the container lid is circular in shape. In at least one embodiment, the container lid is square or rectangular in shape.

The container, container ring, and container lid discussed herein may be formed in any suitable way. In various embodiments, the container, container ring, and container lid are formed by injection molding. In particular embodiments, the container, container ring, and container lid are 3D printed or created via other additive manufacturing technique. In further embodiments, various components of the container, container ring, and container lid are formed or created separately, and the various components of the container, container ring, and container lid are joined or otherwise suitably connected to form the container, container ring, and container lid. In one embodiment, the container, container ring, and/or container lid may each be one piece and unitary.

The container, container ring, and container lid may be formed from any suitable material or materials for storing or transporting such materials. In various embodiments, the container, container ring, and container lid are manufactured from metal or composite material. In particular embodiments, the container, container ring, and container lid are manufactured from plastic (e.g., Polyethylene, High-Density Polyethylene, etc.).

As will be understood by one of ordinary skill in the art, the container, container ring, and container lid discussed herein may be used for storing and sealing any variety of materials, including, but not limited to: paints, oils, food, consumer goods, construction materials, inks, chemicals, lubricants, adhesives, coatings, roofing mastics, driveway sealers, flavorings, sanitation supplies, building products, ice melt compounds, powders, pet food, and other such materials.

Exemplary Embodiments

Turning now to FIG. 1, an exploded view of an exemplary container 1100 and container ring 1000 are shown, according to one embodiment of the present disclosure. In some embodiments, the container ring 1000 and the container 1100 are circular in shape and have a substantially similar radius. In various embodiments, the container ring 1000 and container 1100 may be rectangular or square in shape. In various embodiments, the container ring 1000 attaches to the container 1100 to facilitate a liquid-tight seal. In one or more embodiments, the container ring 1000 attaches to the container 1100 by placing the bottom 1008 of the container ring 1000 snugly around the rim 1104 of the container 1100 (as further discussed herein). In certain embodiments, the container ring 1000 and the container are manufactured out of plastic (e.g., Polyethylene, Polyethylene Terephthalate (PET), High-Density Polyethylene (HDPE), Polyvinyl Chloride (PVC), Low-Density Polyethylene (LDPE), Polypropylene (PP), Polystyrene (PP), etc.).

In particular embodiments, the container ring 1000 may include various components to facilitate a seal with the container 1100. In at least one embodiment, and as will be further discussed herein, the container ring includes an inner sidewall 1004 and an outer sidewall 1016 connected by a floor 1020. In one or more embodiments, and as shown in FIG. 1, the distance between the inner sidewall 1004 and the outer sidewall 1016 may be any suitable distance (e.g., 0.8-1.2 cm, 4.8-5.2, cm, 9.8-10.2 cm, etc.). In some embodiments, and as will be further described herein, a container lid (e.g., a plug) includes corresponding sealing components, that may align and engage with the inner sidewall 1004 of the container ring 1000 to provide a liquid-tight seal when pressed together.

In one embodiment, and as shown in FIG. 1, the container 1100 includes a container body 1102. In particular embodiments, the container body 1102 includes an external wall 1110 to enclose the container 1100 and provide a solid base for stability. In some embodiments, the external wall 1110 may include graphical information (e.g., signage). In various embodiments, the container body 1102 terminates at an open end, whereby the open end includes a container rim 1104 around its circumference. In certain embodiments, and as will be further discussed herein, the container rim 1104 includes design features to facilitate a liquid-tight seal when engaged with a container ring 1000. Further, in various embodiments, the container 1100 includes a container bottom 1108 to provide stability and support for the container 1000 when resting on a surface.

Figure 2:
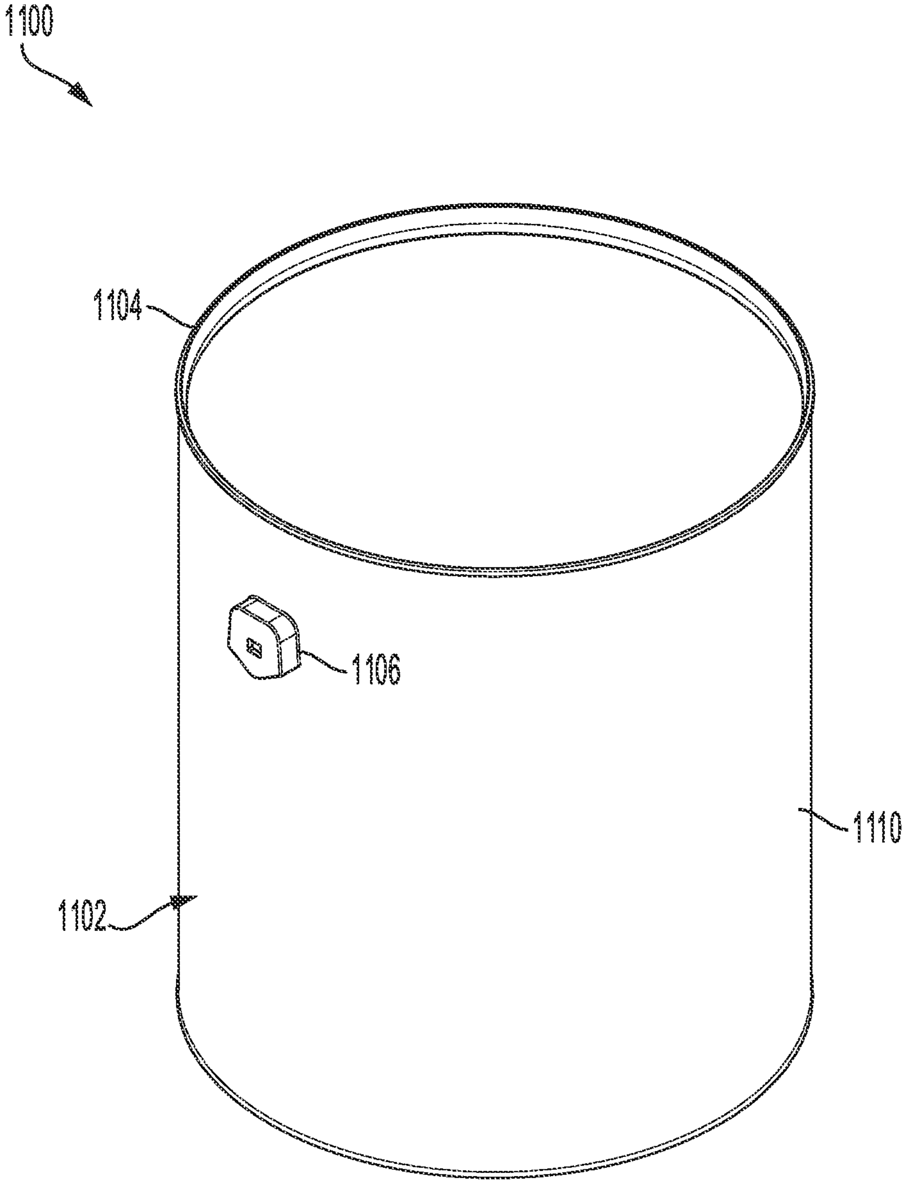
FIG. 2 is a perspective view of an exemplary container, according to one embodiment of the present disclosure.

FIG. 2 shows an exemplary container 1100, according to one embodiment of the present disclosure. In the embodiment shown in FIG. 2, plastic bail ears 1106 are included on the external wall 1110 of the container body 1102, such that a handle may be attached to the container 1100 to facilitate carrying or lifting of the container. In various embodiments, the bail ears 1106 may be circular, pentagonal, rectangular, or any suitable shape. In particular embodiments, the bail ears 1106 may be affixed to the external wall 1110 of the container body 1102, or, in one or more embodiments, the bail ears 1106 may be an integral component of external wall 1110 of the container body 1102.

Figure 3:
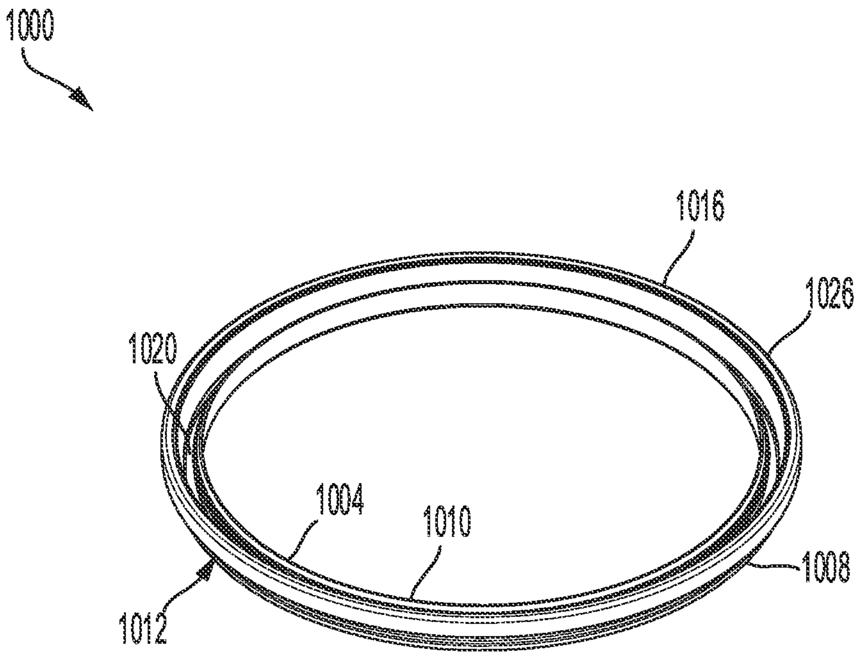
FIG. 3 is a perspective view of an exemplary container ring, according to one embodiment of the present disclosure.

FIG. 3 shows an exemplary container ring 1000, according to one embodiment of the present disclosure. In particular embodiments, and as shown in FIG. 3, a top surface 1026 of the outer sidewall 1016 is at a higher elevation than a top surface 1010 of the inner sidewall 1004 relative to the container ring floor 1020. In certain embodiments, the thickness of the inner sidewall 1004 is less than the thickness of the outer sidewall 1016. As will be further discussed herein, in some embodiments, the outer sidewall 1016 includes an aperture 1012 beneath the top surface 1026 to facilitate attachment of the container ring 1000 to the rim of a container. In at least one embodiment, the outer sidewall 1016 extends upward at an angle greater than ninety degrees from the container ring floor 1020. In one or more embodiments, the inner sidewall 1004 has a smaller radius than the outer sidewall 1016, whereby the difference in radii is substantially equivalent to the width of the container ring floor 1020. In some embodiments, the width of container floor 1020 and the angle of the outer sidewall 1026 generally prevent liquid from getting trapped in the container ring 1000. In at least one embodiment, the floor 1020 of the container ring 1000 includes a generally smooth surface.

Figure 4:
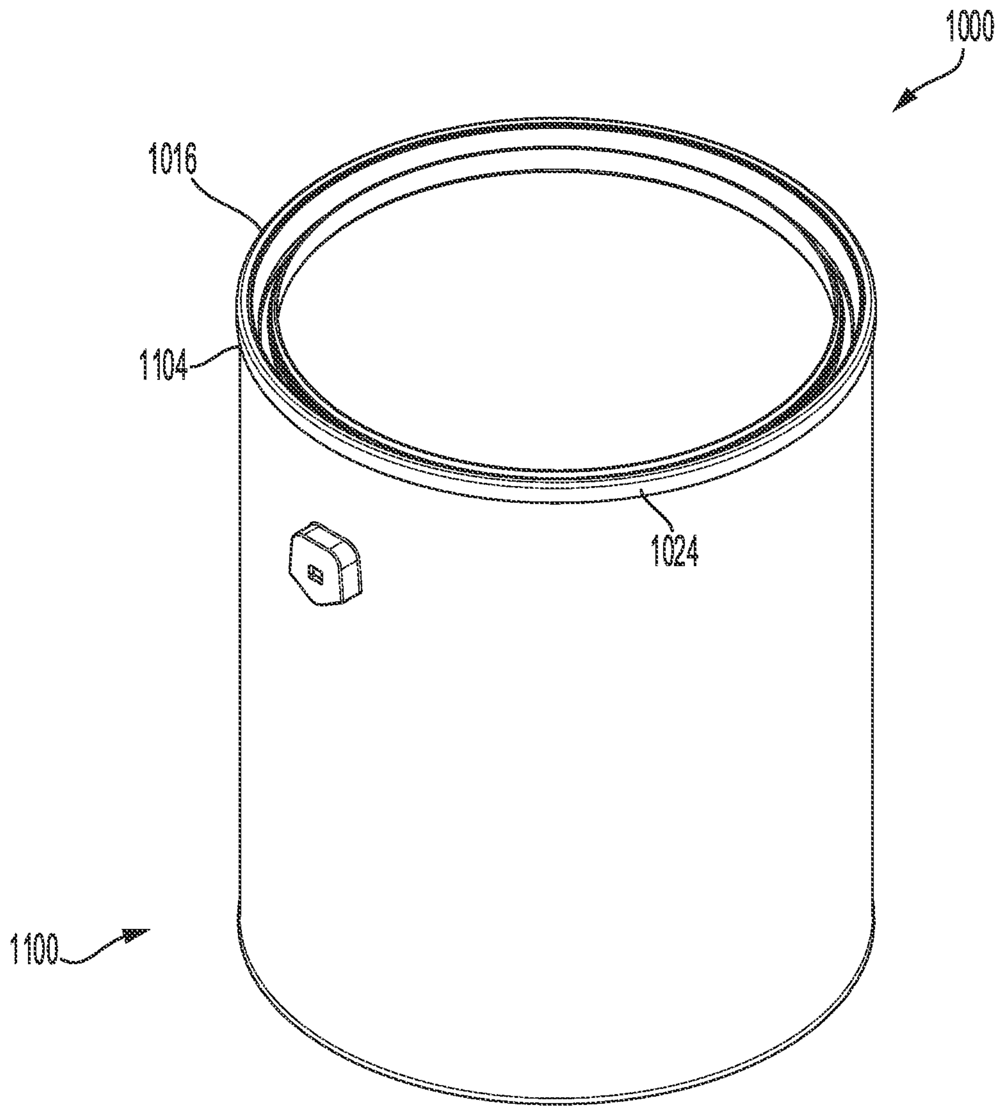
FIG. 4 is a perspective view of an exemplary container ring and container in an attached configuration, according to one embodiment of the present disclosure.

Turning now to FIG. 4, a perspective view of an exemplary container ring 1000 attached to an exemplary container 1100 is shown, according to one embodiment of the present disclosure. In various embodiments, and as shown in FIG. 4, when the container ring 1000 is attached to the container 1100, the container rim 1104 of the container 1100 is substantially enveloped by the container ring 1000, such that an outer surface 1024 of the outer sidewall 1016 extends over the edge of the container rim 1104.

Figure 5:
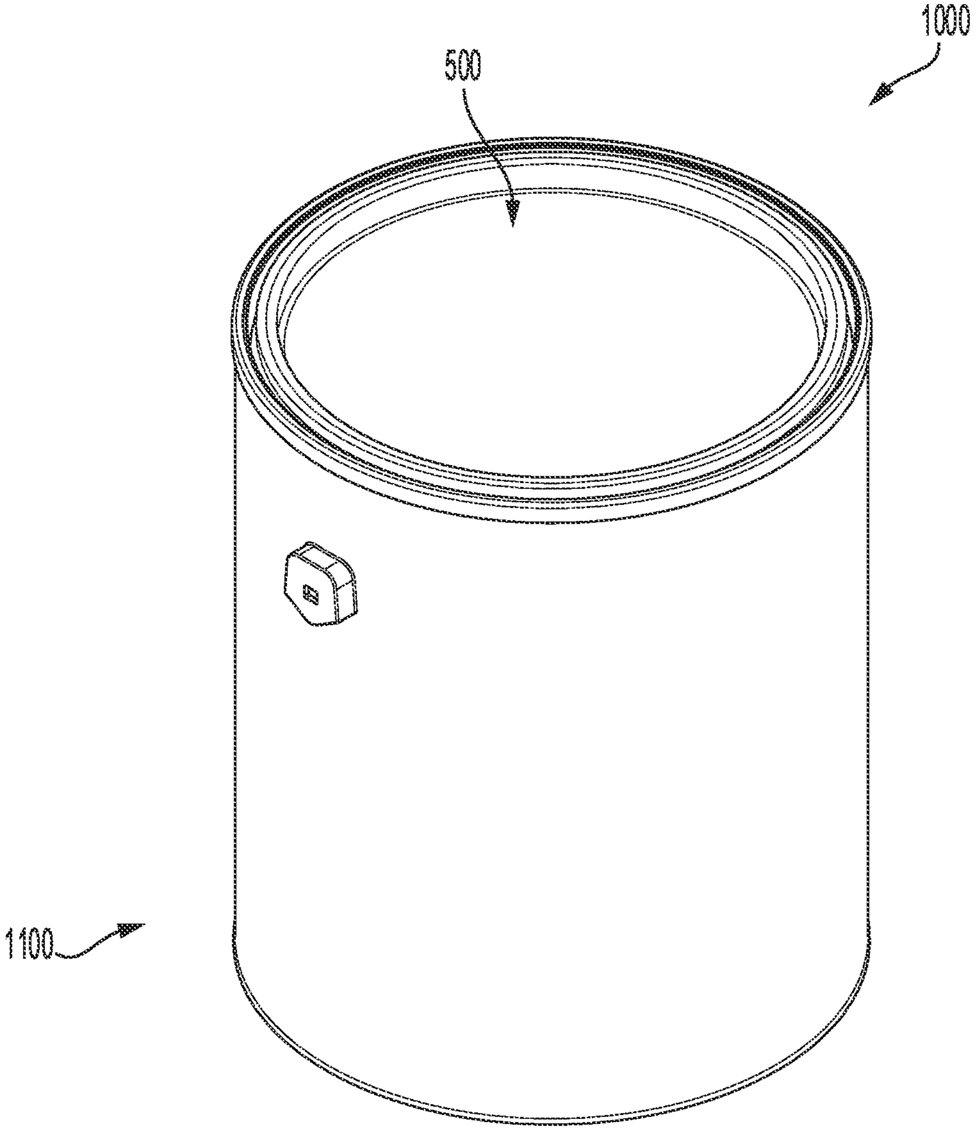
FIG. 5 is a perspective view of an exemplary container ring, container and container lid in an attached configuration, according to one embodiment of the present disclosure.

FIG. 5 shows an exemplary container ring 1000, container 1100, and container lid 500 in an attached configuration, according to one embodiment of the present disclosure. In particular embodiments, and as will be discussed herein, various sealing components of the container lid 500 engage with the inner sidewall (not shown) of the container ring 1000 to facilitate a liquid-tight seal of the container 1100.

Figure 6:
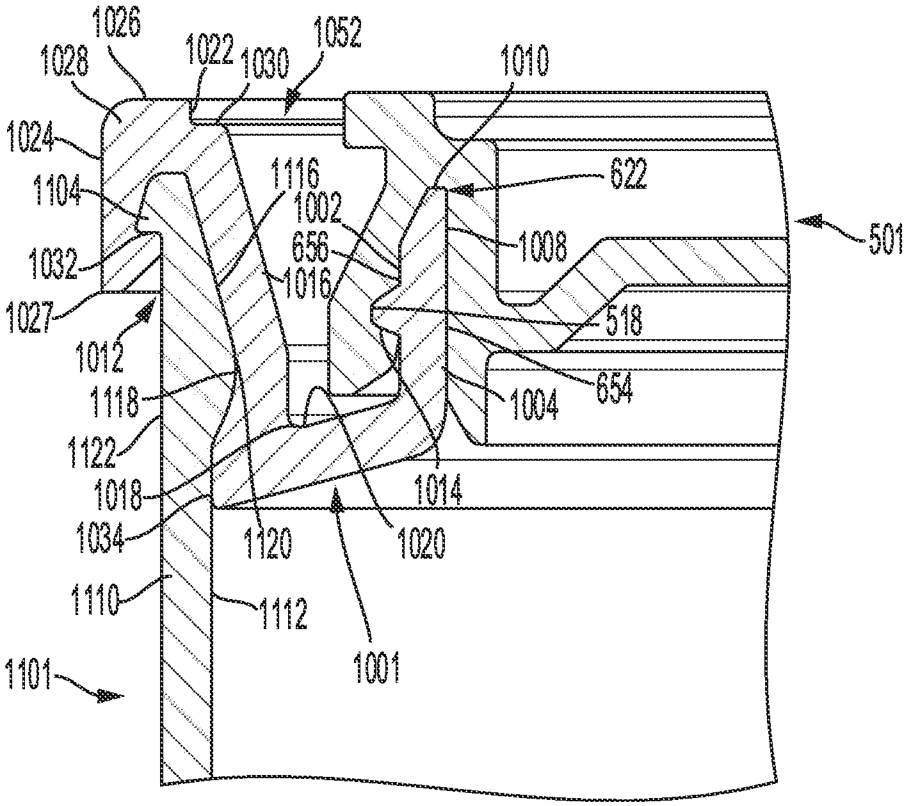
FIG. 6 is a cross-sectional view of an exemplary container ring, container and container lid in an attached configuration, according to one embodiment of the present disclosure.

Now referring to FIG. 6, a cross-sectional view of an exemplary container ring, container 1101, and container lid 501 in an attached configuration is shown, according to one embodiment of the present disclosure. In various embodiments, the container 1101 includes an external wall 1110 with an outer surface 1122 and an inner surface 1112. In certain embodiments, the external wall 1110 of the container 1101 extends upward from the container bottom and transitions into a container rim 1104 at the upper end of the container 1101. In at least one embodiment, the container rim 1104 extends outward from the outer surface 1122 of the external wall 1110 to form a latch surface 1032 for engaging with the container ring 1001, as will be further discussed herein. In certain embodiments, and as shown in FIG. 6, the upper portion 1116 of the inner surface 1112 of the external wall 1110 protrudes outwardly from the external wall 1110 and establishes a generally semi-circular bead 1118. In one or more embodiments, the bead 1118 may have a radius less than 1 cm. In particular embodiments, the generally semi-circular bead 1118 transitions downward to an exterior floor surface 1034. In one or more embodiments, the exterior floor surface 1034 may be substantially parallel to the external wall 1110 of the container 1101.

In particular embodiments, the container ring 1001 includes a generally u-shaped channel 1052. In the embodiment shown in FIG. 6, the u-shaped channel 1052 (from a cross-sectional perspective) includes two sidewalls 1004, 1016 connected by a floor 1020 that generally slopes from the inner sidewall 1004 downwardly to the outer sidewall 1016, whereby the outer sidewall 1016 and the floor 1020 form a substantially rounded connection 1018. In certain embodiments, the floor 1020 may slope at an angle between forty-five and ninety degrees, preferably at an angle between forty-five and fifty degrees, relative to the outer sidewall 1016. In one or more embodiments, and as shown in FIG. 6, the distance between the inner sidewall 1004 and the outer sidewall 1016 may be any suitable distance (e.g., 0.8-1.2 cm, 4.8-5.2, cm, 9.8-10.2 cm, etc.).

As will be further discussed below, the inner sidewall 1004 includes seal surfaces 1002, 1008, and integrally formed protrusions (e.g., ring bead 1014) of the container ring 1000. In particular embodiments, the seal surfaces 1002, 1008 of the inner sidewall 1004 converge at an upper portion of the container ring 1001 into a substantially trapezoidal peak (e.g., top surface 1010), which fits into a corresponding trapezoidal cavity 622 on the container lid 501. In certain embodiments, top surface 1010 (and the corresponding cavity on the container lid) may be substantially rectangular. In particular embodiments, top surface 1010 (and the corresponding cavity on the container lid) may be substantially rounded. In some embodiments, the inner sidewall 1004 may include a notch (not shown) on the seal surface 1008 for engaging with a corresponding notch on a container lid. In one embodiment, the seal surfaces 1002, 1008 may be composed of an elastomer. In another embodiment, the seal surfaces 1002, 1008 are composed of plastic. In various embodiments, and as shown in FIG. 6, the seal surfaces 1002, 1008 of the container ring 1001 are substantially flush against the seal surfaces 654, 656 of the container lid 501 (including the trapezoidal cavity 622), such that a liquid-tight seal is facilitated.

Continuing with the embodiment shown in FIG. 6, the inner sidewall 1004 includes a ring bead 1014 (or other suitable protrusion) that protrudes into the u-shaped channel 1052 of the container ring 1001. In various embodiments, the ring bead 1014 may be substantially trapezoidal or substantially rounded in shape. In one or more embodiments, the ring bead 1014 (e.g., protrusion) engages with a corresponding seal structure on the container lid 501, such that a liquid-tight seal between the container ring 1001 and the container lid 501 may be formed. For example, in particular embodiments, the ring bead 1014 engages with a corresponding undercut 518 on the container lid, and, in combination with the seal surfaces 1002, 1008, facilitates a liquid-tight seal between the container ring 1000 and the lid 501. As will be understood from discussions herein, the inner sidewall 1004 is received within a generally u-shaped channel of a container lid 501, and the seal surfaces 1002, 1008 and ring bead 1014 help create a seal between the inner sidewall 1004 and the container lid 501, thereby sealing an interior/storage area of the container.

Further continuing with the embodiment shown in FIG. 6, the outer sidewall 1016 includes various features for engaging with, and sealing a container 1101. In certain embodiments, the outer sidewall 1016 may be substantially concave. In particular embodiments, the outer sidewall 1016 includes an upper portion 1028 that includes an aperture 1012, such that the upper portion 1028 of the outer sidewall 1016 is substantially hook-shaped. In at least one embodiment, and as shown in FIG. 6, the aperture 1012 engages with the container rim 1104, whereby the bead 1118 on the upper portion 1116 of the inner surface 1112 of the external wall 1110 is flush against the outer sidewall 1016 of the container ring 1001, such that a liquid-tight seal is formed. In particular embodiments, the apex 1120 of the bead 1118 on the upper portion 1116 of the inner surface 1112 of the external wall 1110 makes contact with the outer sidewall 1016 of the container ring 1001. In these embodiments (and others), the exterior floor surface 1034 is flush against the inner surface 1112 or the external wall 1110 such that a liquid-tight seal is formed. In one or more embodiments, pressure exerted on the container lid 501 is transferred to the interface between the bead 1118 on the container 1101 and the hook and latch structure of the seal container ring 1001 and container 1101, such that sealing properties are increased.

In one or more embodiments, the upper portion 1028 of the outer sidewall 1016 includes a top surface 1026. In particular embodiments, the top surface 1026 is substantially flat and substantially parallel to the container bottom. In certain embodiments, the top surface 1026 transitions down to a secondary surface 1030 of the outer sidewall 1016 via a vertical wall 1022. In one or more embodiments, the top surface 1026 of the upper portion 1028 is at a higher elevation from the bottom of the container than the secondary surface 1030 of the outer sidewall 1016. In at least one embodiment, the secondary surface 1030 is substantially flat and substantially parallel to the container bottom.

In particular embodiments, the upper portion 1028 of the outer sidewall 1016 of the container ring 1001 includes a bottom surface 1027 that is substantially parallel to the top surface 1026. In some embodiments, the top surface 1026 and the bottom surface 1027 of the upper portion 1028 of the outer sidewall 1016 are integrally connected by an outer surface 1024 of the outer sidewall 1016. In some embodiments, the distance between the top surface 1026 of the upper portion 1028 and the bottom surface 1027 of the upper portion 1028 may be less than 30 mm.

In at least one embodiment, the top surface 1026 of the upper portion 1028 of the outer sidewall 1016 is at a first distance from the bottom surface of the container ring 1001, and the top surface 1010 of the inner sidewall 1004 (e.g., the trapezoidal peak) is at a second distance from the bottom surface of the container ring 1001, where the first distance is greater than the second distance. In particular embodiments, the "tiered elevation" of the top surface 1026 of the outer sidewall 1016 and the top surface 1010 of the inner sidewall 1004 (e.g., the trapezoidal peak) may help increase stability and load distribution when two (or more) containers 1101 and container rings 1001 are stacked together (e.g., for shipping, without lids), as portions of the container bottom may match the tiered elevation of the sidewalls 1004, 1016 of the container ring 1001.

Figure 7:
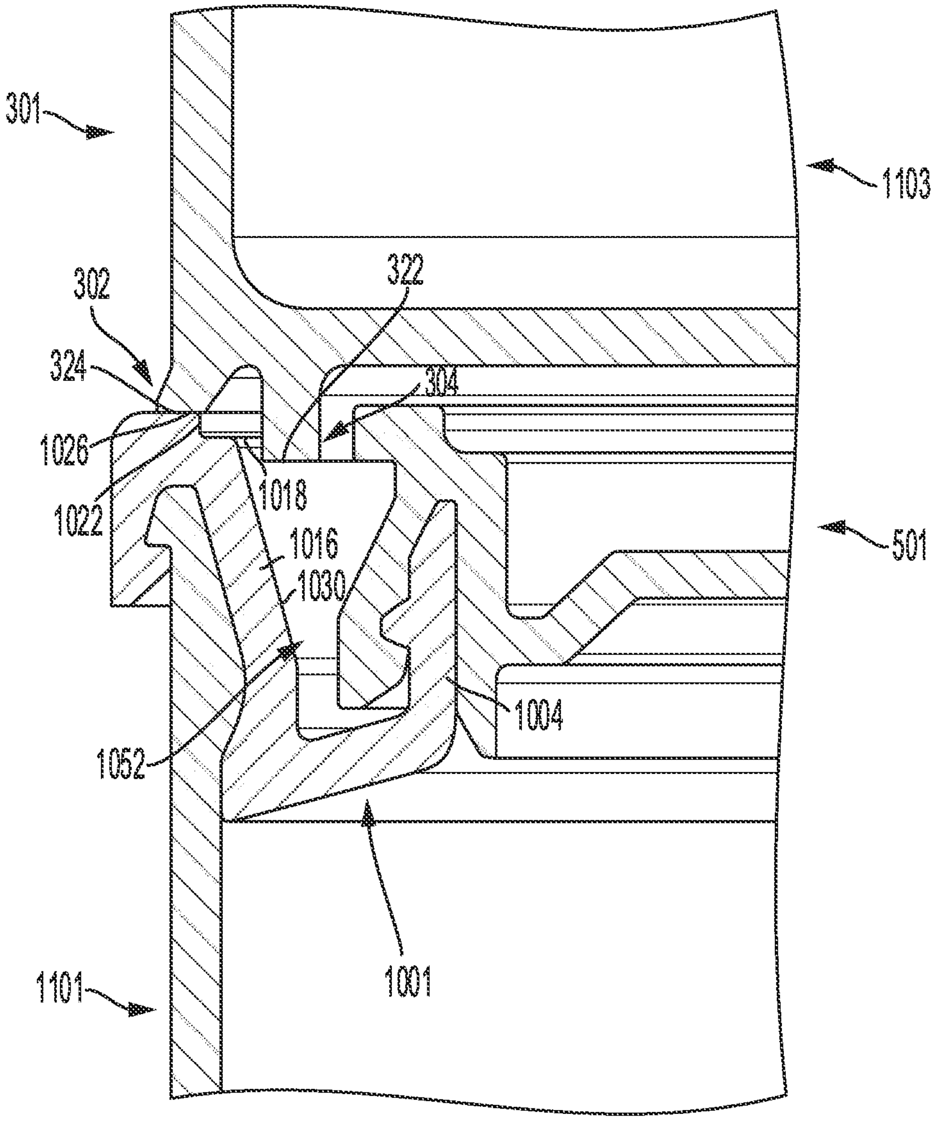
FIG. 7 is a cross sectional view of an exemplary container stacked on top of a container, container ring, and container lid in an attached configuration, according to one embodiment of the present disclosure.

Turning now to FIG. 7, a cross sectional view of an exemplary container 1103 stacked on top of a container 1101, container ring 1001, and container lid 501 in an attached configuration is shown, according to one embodiment of the present disclosure. As shown in the present embodiment, a container bottom 301 sits on top of a container lid 501 engaged in a seal with a container ring 1001 attached to a container 1101. In various embodiments, the container bottom 301 includes legs 302, 304 to provide stability for the container 1103. In various embodiments, the upper leg 302 includes a base 324 and the lower leg 304 includes a base 322. In particular embodiments, the bases 322, 324 are substantially parallel to the container bottom and provide support when the container 1103 is rested on a surface.

In various embodiments, and as shown in FIG. 7, the substantially flat shape of the top surface 1026 of the outer sidewall 1016 provides a level surface for the base 324 of the upper leg 302 to rest upon. In these embodiments (and others), the lower leg 304 and the upper leg 302 may straddle the secondary surface 1030 of the outer sidewall 1016.

As discussed above, and shown in FIG. 7, the tiered elevation of the sidewalls 1004, 1016 of the container ring 1001 in combination with the vertical height of the lid 501, provides stability and load distribution when two (or more) containers 1101, 1103 with container rings 1001 attached are stacked together.

Figure 8:
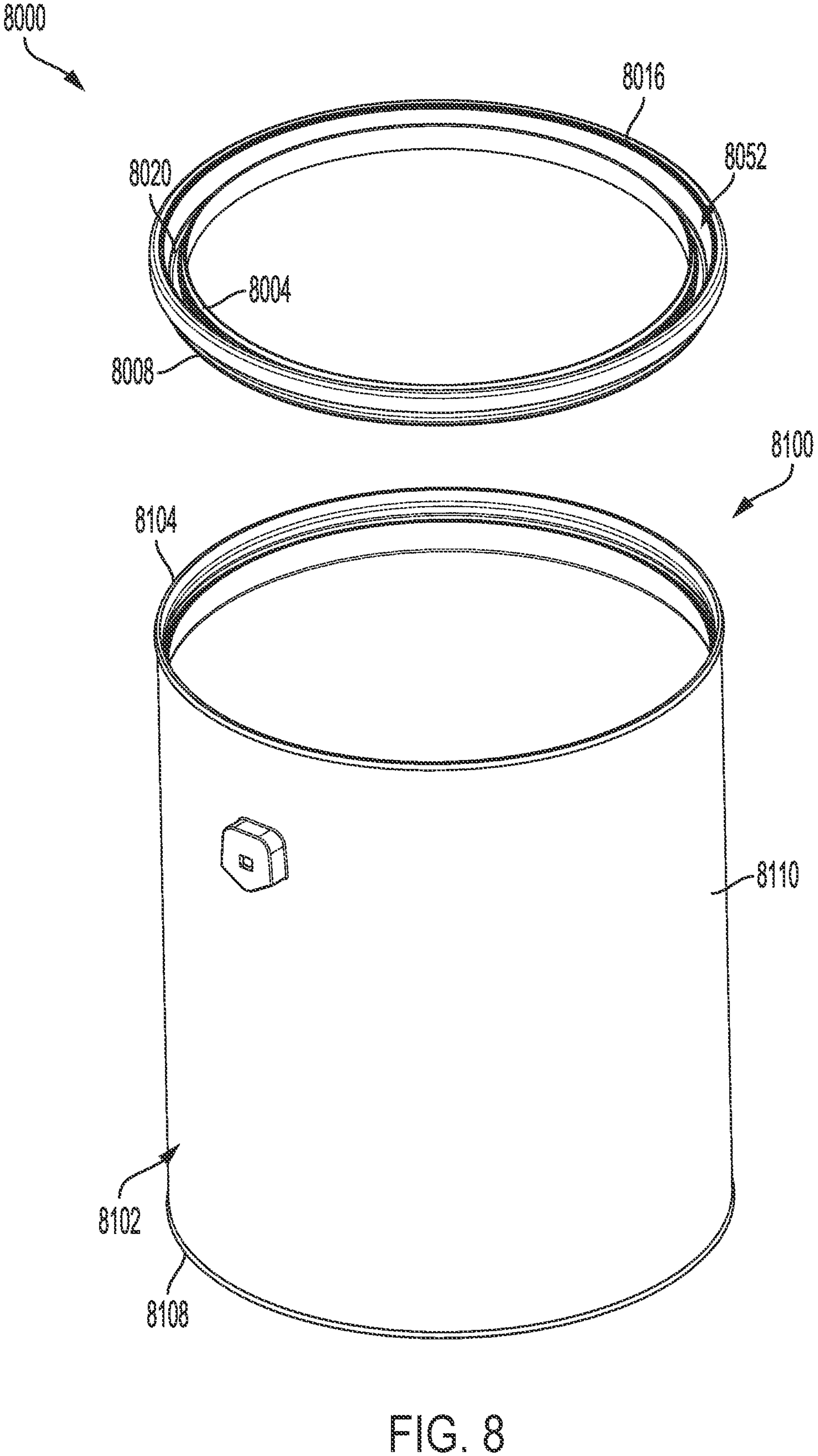
FIG. 8 is an exploded view of an exemplary container and container ring, according to one embodiment of the present disclosure.

Now referring to FIG. 8, an exploded view of an exemplary container 8100 and container ring 8000 is shown, according to one embodiment of the present disclosure. In some embodiments, the container ring 8000 and the container 8100 are circular in shape and have a substantially similar diameter. In various embodiments, the container ring 8000 and container 8100 may be rectangular or square in shape.

In some embodiments, the container ring 8000 attaches to the container 8100 to facilitate a liquid-tight seal. In one or more embodiments, the container ring 8000 attaches to the container 8100 by securing an aperture of the container ring 8000 over the rim of the container 8100, in combination with the engagement of the container's u-shaped crevice and the container ring's lower seal structure (as further discussed herein).

The container ring 8000 and the container 8100 may be constructed of any suitable material or materials. In many embodiments, the container ring 8000 and the container 8100 are constructed of the same material. In some embodiments, the container ring 8000 and the container 8100 are constructed of different materials. In certain embodiments, the container ring 8000 and the container 8100 are manufactured out of plastic (e.g., Polyethylene, Polyethylene Terephthalate (PET), High-Density Polyethylene (HDPE), Polyvinyl Chloride (PVC), Low-Density Polyethylene (LDPE), Polypropylene (PP), Polystyrene (PP), etc.).

In particular embodiments, the container ring 8000 may include various components to facilitate a seal with the container 8100. In at least one embodiment, and as will be further discussed herein, the container ring includes a u-shaped channel 8052 formed by an inner sidewall 8004 and an outer sidewall 8016 connected by a floor 8020. As will be understood from discussions herein, in some embodiments, the u-shaped channel 8052 receives a portion of a lid (e.g., container lid 500 discussed herein). As also will be understood from discussions herein, a container lid may include corresponding sealing components that may align and engage with the inner sidewall 8004 of the container ring 8000 to cover the container 8100 and provide a liquid-tight seal when pressed together.

In one embodiment, and as shown in FIG. 8, the container 8100 includes a container body 8102. In particular embodiments, the container body 8102 includes an external wall 8110 extending from a circular bottom 8108. In at least one embodiment, the external wall encloses and/or forms an internal cavity (e.g., storage area) of the container 8100. In various embodiments, the container body 8102 terminates at a container rim 8104 formed around the container body 8102 circumference. In certain embodiments, and as will be further discussed herein, the external wall 8110 forms features to facilitate a liquid-tight seal when engaged with a container ring 8000.

Figure 9:
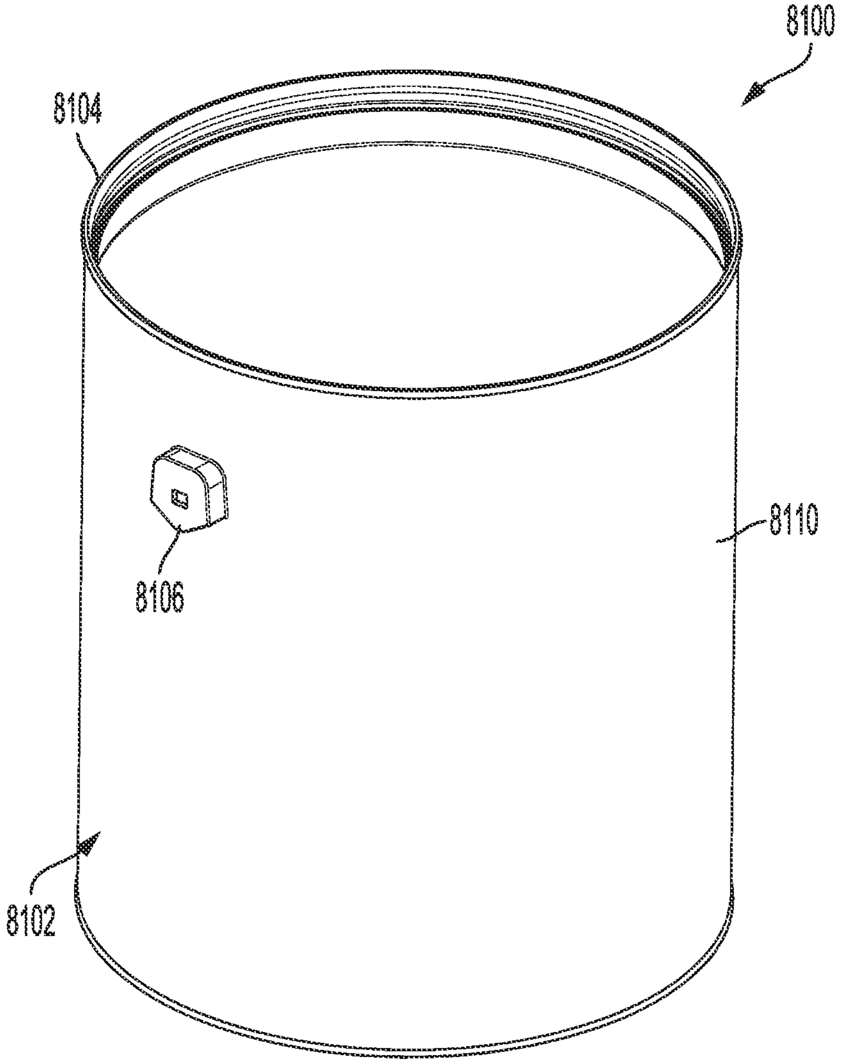
FIG. 9 is a top perspective view of an exemplary container, according to one embodiment of the present disclosure.
Figure 10:
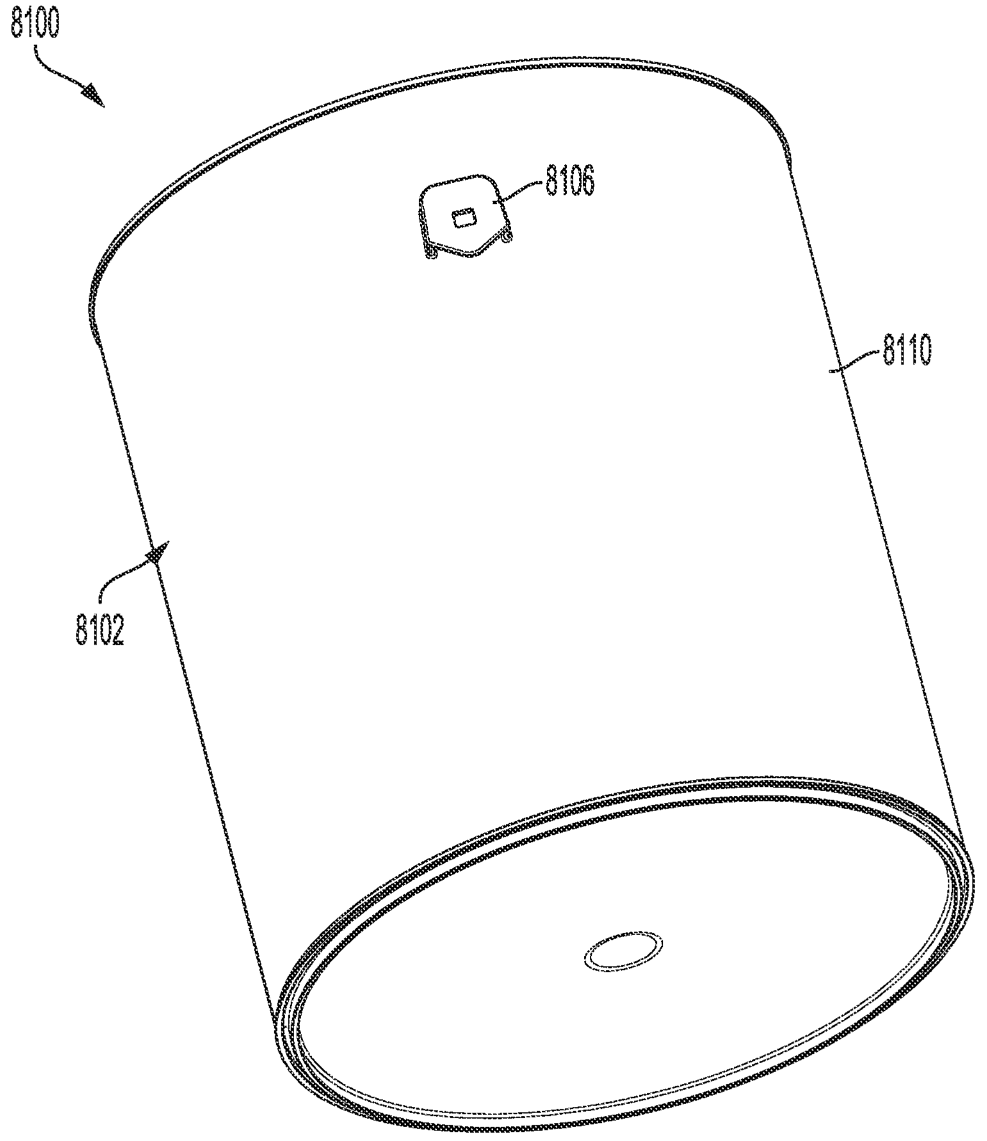
FIG. 10 is a bottom perspective view of an exemplary container, according to one embodiment of the present disclosure.

FIGS. 9 and 10 show a top perspective view and a bottom perspective view of exemplary container 8100, according to one embodiment of the present disclosure. In some embodiments, the external wall 8110 may include graphical information (e.g., signage). As shown in the embodiments of FIGS. 9 and 10, the container 8100 may include one or more bail ears 8106 attached to the external wall 8110 of the container body 8102, such that a handle may be attached to the container 8100 to facilitate carrying or lifting of the container. In various embodiments, the bail ears 8106 may be circular, pentagonal, rectangular, or any suitable shape. In particular embodiments, the bail ears 8106 may be affixed to the external wall 8110 of the container body 8102, or, in one or more embodiments, the bail ears 8106 may be an integral component of external wall 8110 of the container body 8102. In certain embodiments, the container 8100 may include a container bottom 8108 for providing support for the container 8100. In various embodiments, the container bottom 8108 and external wall 8110 combine to form a cavity for storing things within the container 8100.

Figure 11:
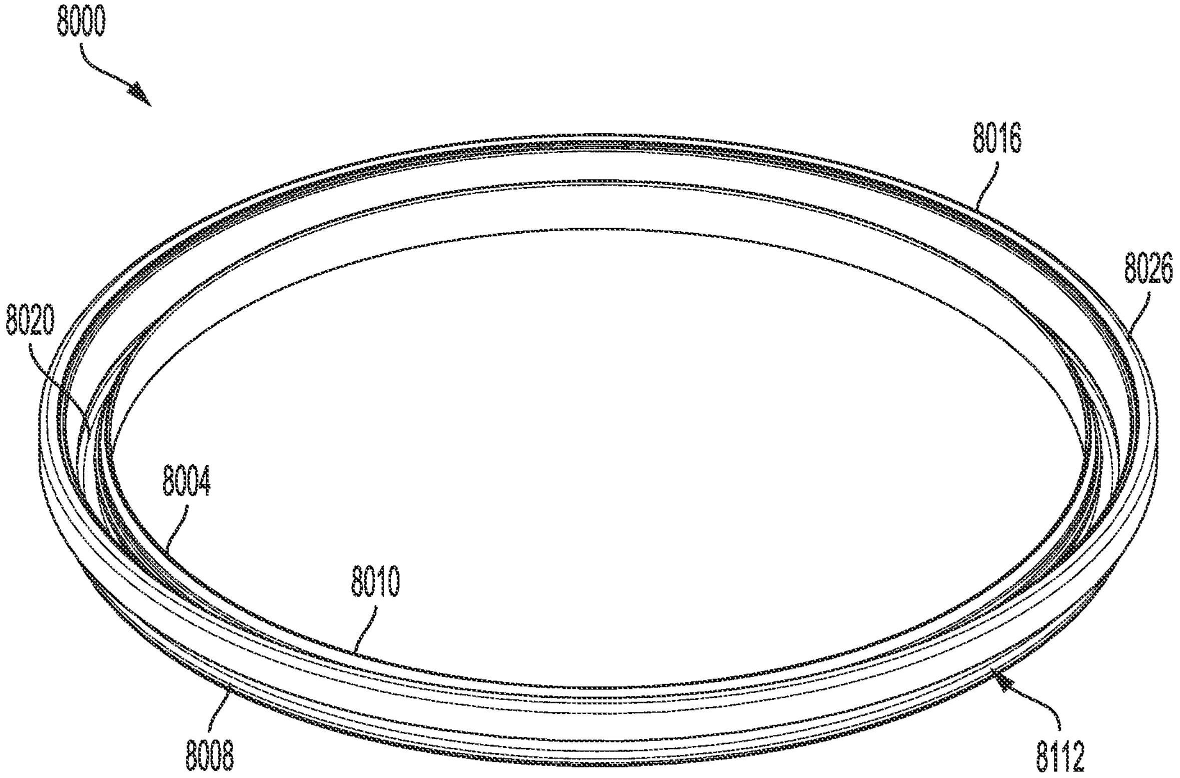
FIG. 11 is a top perspective view of an exemplary container ring, according to one embodiment of the present disclosure.

Turning now to FIG. 11, this figure shows a top perspective view of an exemplary container ring 8000, according to one embodiment of the present disclosure. In particular embodiments, and as shown in FIG. 11, a top surface 8026 of the outer sidewall 8016 is at a higher elevation than a top surface 8010 of the inner sidewall 8004 relative to the container ring floor 8020.

As will be further discussed herein, in some embodiments, the outer sidewall 8016 forms an aperture 8012 beneath the top surface 8026 to facilitate attachment of the container ring 8000 to the rim of a container. In one or more embodiments, the inner sidewall 8004 has a smaller diameter than the outer sidewall 8016, whereby the difference in diameter is substantially equivalent to the width of the container ring floor 8020. In some embodiments, the width of container floor 8020 and the angle of the outer sidewall 8026 generally prevent liquid from getting trapped in the container ring 8000. In at least one embodiment, the floor 8020 of the container ring 8000 includes a generally smooth surface.

Figure 12:
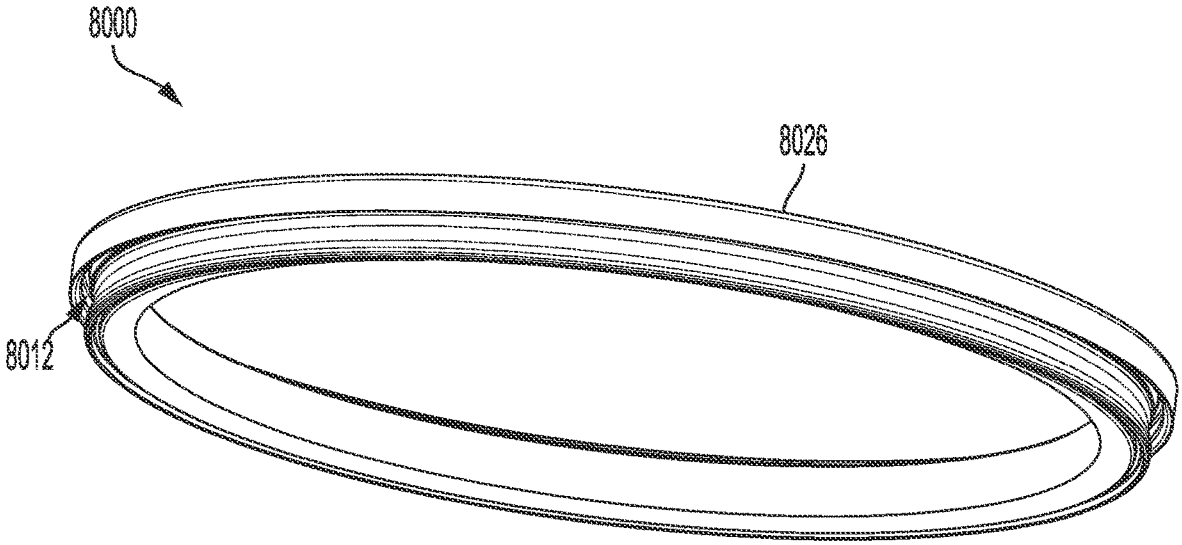
FIG. 12 is a bottom perspective view of an exemplary container ring, according to one embodiment of the present disclosure.

FIG. 12 shows a bottom perspective view of an exemplary container ring 8000, according to one embodiment of the present disclosure. The embodiment shown in FIG. 12 includes an aperture 8012 beneath the top surface 8026 of the container ring 8000. In particular embodiments, the aperture 8012 facilitates attachment to a container by providing a snug, liquid-tight connection to the rim of a container. In various embodiments, and as will be further described herein, the container ring 8000 includes various seal features (e.g., hooks, notches, protrusions, etc.) that engage with corresponding features on the container to provide a liquid-tight seal and prevent undesired exposure and/or degradation of a product being sealed.

Figure 13:
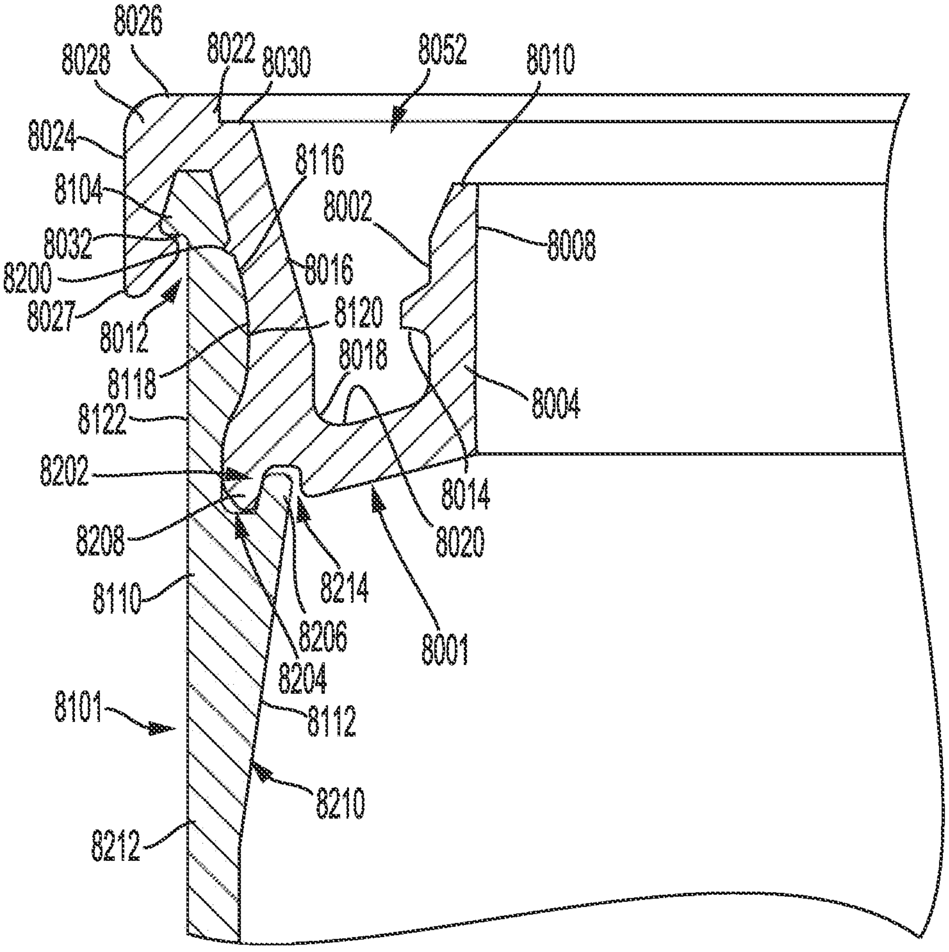
FIG. 13 is a cross sectional view of an exemplary container and container ring in an attached configuration, according to one embodiment of the present disclosure.

Turning now to FIG. 13, a cross-sectional view of an exemplary container 8100 and container ring 8000 in an attached configuration is shown, according to one embodiment of the present disclosure. In particular embodiments, the exemplary container 8100 and container ring 8000 include various seal features to facilitate formation of a liquid-tight seal when in an attached configuration. According to particular embodiments, the exemplary container 8100 and container/seal ring 8000 include: i) a u-shaped crevice (container 8100) for engaging with a lower seal structure (seal ring 8000); ii) a container rim area 8104 with latch-like features for engaging with hook-like features on a seal ring 8000; and iii) an inner sidewall 8004 (seal ring 8000) with various seal features (e.g., ring bead 8014) for engaging with corresponding seal features on a container lid (not shown).

In various embodiments, the container 8100 includes an external wall 8110 with an outer surface 8122 and an inner surface 8112. In at least one embodiment, the distance (e.g., thickness) between the inner surface 8112 and the outer surface 8122 gradually increases from the bottom portion 8212 of the ledge area 8210 to the top of the ledge area (which forms the u-shaped crevice 8204). In particular embodiments, the bottom portion 8212 of the ledge area 8210 may be between about 7 and 30 cm from the container bottom (e.g., 7 cm, 10 cm, 15 cm, 25 cm, etc.). In certain embodiments, and as shown in FIG. 13, the distance (e.g., thickness) between the inner surface 8112 and the outer surface 8122 abruptly decreases at the top of the ledge area 8210 and remains relatively consistent from the top ledge area to the bottom of the semi-circular bead 8118 (as will be further discussed herein).

In certain embodiments, the external wall 8110 of the container 8100 extends upward from the container bottom and transitions into a container rim 8104 at the upper end of the container 8100 (e.g., above the semi-circular bead 8118). In at least one embodiment, the container rim 8104 extends outward from the outer surface 8122 of the external wall 8110 to form a latch surface 8032 for engaging with the container ring 8000, as will be further discussed herein.

In certain embodiments, and as shown in FIG. 13, the upper portion 8116 of the inner surface 8112 of the external wall 8110 protrudes outwardly from the external wall 8110 and forms a generally semi-circular bead 8118. In one or more embodiments, the semi-circular bead 8118 may have a radius less than 1 cm. In particular embodiments, the semi-circular bead 8118 transitions downward to the top portion of the ledge area 8210.

In particular embodiments, the container ring 8000 includes a generally u-shaped channel 8052. In the embodiment shown in FIG. 13, the u-shaped channel 8052 (from a cross-sectional perspective) includes two sidewalls 8004, 8016 connected by a floor 8020 that generally slopes from the inner sidewall 8004 downwardly to the outer sidewall 8016, whereby the outer sidewall 8016 and the floor 8020 form a substantially rounded connection 8018. In certain embodiments, the floor 8020 (e.g., bottom surface) may slope at an angle between forty-five and ninety degrees. In some embodiments, the floor 8020 slopes at an angle between forty-five and fifty degrees, relative to the outer sidewall 8016. In particular embodiments, the floor 8020 (e.g., bottom surface) may slope at an angle between 95 and 150 degrees relative to the inner sidewall 8004. In one or more embodiments, and as shown in FIG. 13, the distance between the inner sidewall 8004 and the outer sidewall 8016 may be any suitable distance (e.g., 0.8-1.2 cm, 4.8-5.2, cm, 9.8-10.2 cm, etc.). In at least one embodiment, the floor 8020 of the container ring 8000 includes a generally smooth surface.

In particular embodiments, the outer sidewall 8016 is substantially arcuate (e.g., concave) in shape. In certain embodiments, the outer sidewall 8016 is substantially arcuate such that it forms a flush connection with the semi-circular bead 8118 of a container 8100 when in an attached configuration. In at least one embodiment, the bottom portion of the outer sidewall 8016 is a greater thickness than the top portion of the outer sidewall 8016 (as shown in the cross-sectional view of FIG. 13). In various embodiments, a bottom portion of the outer sidewall 8016 transitions into a lower seal structure 8202 for engaging with a corresponding ledge area 8210 of a container 8100.

As will be further discussed below, the inner sidewall 8004 includes seal surfaces 8002, 8008, and integrally formed protrusions (e.g., ring bead 8014) of the container ring 8000. In particular embodiments, the seal surfaces 8002, 8008 of the inner sidewall 8004 converge at an upper portion of the container ring 8000 into a substantially trapezoidal peak (e.g., top surface 8010), which fits into a corresponding trapezoidal cavity on a container lid (not shown). In certain embodiments, top surface 8010 may be substantially rectangular. In particular embodiments, top surface 8010 may be substantially rounded. In one embodiment, the seal surfaces 8002, 8008 may be composed of an elastomer. In another embodiment, the seal surfaces 8002, 8008 are composed of plastic. In various embodiments, the seal surfaces 8002, 8008 of the container ring 8000 are substantially flush against the seal surfaces of a container lid (including a trapezoidal cavity), such that a liquid-tight seal is facilitated.

Continuing with the embodiment shown in FIG. 13, the inner sidewall 8004 includes a ring bead 8014 (or other suitable protrusion) that protrudes into the u-shaped channel 8052 of the container ring 8000. In various embodiments, the ring bead 8014 may be substantially trapezoidal or substantially rounded in shape. In certain embodiments, the ring bead 8014 may include a front surface substantially parallel to the inner sidewall 8004. In certain embodiments, the ring bead 8014 may include a top surface that slopes downwardly from the inner sidewall 8004 to the front surface of the ring bead 8014. In these embodiments (and others), the ring bead 8014 may include a substantially concave bottom surface that slopes downwardly from the front surface of the ring bead 8014 to the inner sidewall 8004. In one or more embodiments, the ring bead 8014 (e.g., protrusion) engages with a corresponding seal structure on a container lid (not shown), such that a liquid-tight seal between the container ring 8000 and the container lid may be formed. For example, in particular embodiments, the ring bead 8014 engages with a corresponding undercut on the container lid, and, in combination with the seal surfaces 8002, 8008, facilitates a liquid-tight seal between the container ring 8000 and the lid. As will be understood from discussions herein, the inner sidewall 8004 is received within a generally u-shaped channel of a container lid, and the seal surfaces 8002, 8008 and ring bead 8014 help create a seal between the inner sidewall 8004 and the container lid, thereby sealing an interior/storage area of the container.

Further continuing with the embodiment shown in FIG. 13, the outer sidewall 8016 includes various features for engaging with, and sealing a container 8100. In certain embodiments, the outer sidewall 8016 may be substantially concave. In particular embodiments, the outer sidewall 8016 includes an upper portion 8028 that includes an aperture 8012, such that the upper portion 8028 of the outer sidewall 8016 is substantially hook-shaped.

In particular embodiments, the outer surface of the outer sidewall 8016 includes a seal ring protrusion 8200 that engages with the semi-circular bead 8118 on the container 8100. In one or more embodiments, the seal ring protrusion 8200 is substantially triangular. In some embodiments, the semi-circular bead 8118 may include a corresponding notch (not shown) to facilitate engagement with the seal ring 8200. In the embodiment shown in FIG. 13, the bead 8118 does not include a corresponding notch, such that when the container and container ring are engaged, the seal ring protrusion 8200 establishes a tighter connection with the semi-circular bead 8118, which further improves the sealing functionality of a connected container 8100 and container ring 8000. In particular embodiments, the seal ring protrusion 8200 is substantially opposite the latch surface 8032 (e.g., undercut surface) of the container rim 8104. In some embodiments, the distance between the seal ring protrusion 8200 and the latch surface 8032 is between 0.1 cm and 2.0 cm (e.g., 0.5 cm, 1.0 cm, etc.).

In certain embodiments, the lower portion of the outer sidewall 8016 includes a lower seal structure 8202 to facilitate engagement with the u-shaped crevice 8204 on the container. In some embodiments, the lower seal structure 8202 includes a cavity 8214 between 0.3 cm and 2.0 cm in width (e.g., 0.5 cm, 1.0 cm, etc.). In at least one embodiment, the lower seal structure 8202 also includes an outer leg 8208, whereby the outer leg 8208 is an extension of the exterior sidewall 8110. In at least one embodiment, and as shown in FIG. 13, the lower seal structure 8202 engages with the ledge area 8210 and u-shaped crevice 8204. In these embodiments (and others), an outer leg 8208 (e.g., latch portion) of the container ring 8000 engages with the u-shaped crevice 8204, and the inner crevice arm 8206 of the external wall 8110 of the container 8100 engages with the cavity 8214.

In at least one embodiment, and as shown in FIG. 13, the aperture 8012 engages with the container rim 8104. In various embodiments, the engagement of the aperture 8012 with the container rim 8104 and the lower seal structure 8202 with the u-shaped crevice 8204, and the engagement of the bead 8118 on the upper portion 8116 of the inner surface 8112 of the external wall 8110 with the outer sidewall 8016 of the container ring 8000 (including with the seal ring 8200), forms a liquid-tight seal. In particular embodiments, the apex 8120 of the bead 8118 on the upper portion 8116 of the inner surface 8112 of the external wall 8110 makes contact with the outer sidewall 8016 of the container ring 8000. In one or more embodiments, pressure exerted on the container lid is transferred to the interface between the bead 8118 on the container 8100 and the hook and latch structure of the seal container ring 8000 and container 8100, such that sealing properties are increased.

In one or more embodiments, the upper portion 8028 of the outer sidewall 8016 includes a top surface 8026. In particular embodiments, the top surface 8026 is substantially flat and substantially parallel to the container bottom. In certain embodiments, the top surface 8026 transitions down to a secondary surface 8030 of the outer sidewall 8016 via a vertical wall 8022. In one or more embodiments, the top surface 8026 of the upper portion 8028 is at a higher elevation from the bottom of the container than the secondary surface 8030 of the outer sidewall 8016. In at least one embodiment, the secondary surface 8030 is substantially flat and substantially parallel to the container bottom.

In particular embodiments, the upper portion 8028 of the outer sidewall 8016 of the container ring 8001 includes a bottom surface 8027 that angles upward to form a substantially triangular shape. In these embodiments (and others), the triangular shape of the bottom surface 8027 facilitates secure attachment between the container 8100 and container rim 8000 by forming a ledge-like structure for the container rim to latch onto. In some embodiments, the top surface 8026 and the bottom surface 8027 of the upper portion 8028 of the outer sidewall 8016 are integrally connected by an outer surface 8024 of the outer sidewall 8016. In some embodiments, the distance between the top surface 8026 of the upper portion 8028 and the bottom surface 8027 of the upper portion 8028 may be less than 30 mm.

In at least one embodiment, the top surface 8026 of the upper portion 8028 of the outer sidewall 8016 is at a first distance from the bottom surface of the container ring 8000, and the top surface 8010 of the inner sidewall 8004 (e.g., the trapezoidal peak) is at a second distance from the bottom surface of the container ring 8000, where the first distance is greater than the second distance. In particular embodiments, the "tiered elevation" of the top surface 8026 of the outer sidewall 8016 and the top surface 8010 of the inner sidewall 8004 (e.g., the trapezoidal peak) may help increase stability and load distribution when two (or more) containers 8100 and container rings 8000 are stacked together (e.g., for shipping, without lids), as portions of the container bottom may match the tiered elevation of the sidewalls 8004, 8016 of the container ring 8000.

CONCLUSION

Accordingly, it will be readily understood by those persons skilled in the art that, in view of the above detailed description of the various embodiments and articles of the present disclosure, the present disclosure is susceptible of broad utility and application. Many methods, embodiments, and adaptations of the present disclosure other than those herein described, as well as many variations, modifications, and equivalent arrangements will be apparent from or reasonably suggested by the present disclosure and the above detailed description thereof, without departing from the substance or scope of the present disclosure. Accordingly, while the present disclosure is described herein in detail in relation to various embodiments, it is to be understood that this detailed description is only illustrative and exemplary of the present disclosure and is made for purposes of providing a full and enabling disclosure of the present disclosure. The detailed description set forth herein is not intended nor is to be construed to limit the present disclosure or otherwise to exclude any such other embodiments, adaptations, variations, modifications, and equivalent arrangements of the present disclosure. The scope of the present disclosure is defined solely by the claims appended hereto and the equivalents thereof.

What is claimed is:

1. A container assembly comprising:

a container and a seal ring, wherein:

a central vertical axis intersects a center point of a bottom of the container and a center point of a top of the container and a radial axis intersects the central vertical axis and is perpendicular to the central vertical axis;

the container comprises a container sidewall comprising a ledge configured to engage at least a portion of the seal ring when the seal ring is in an attached configuration with respect to the container, the ledge comprising a u-shaped crevice that is (i) internally located within the container and (ii) configured to engage with at least a portion of a lower seal structure of the seal ring, wherein:

the u-shaped crevice comprises a first crevice sidewall, a second crevice sidewall radially outward from the first crevice sidewall, and a crevice floor extending between the first crevice sidewall and the second crevice sidewall, and the first crevice sidewall and a portion of an interior surface of the container sidewall at least partially define a crevice arm projecting from the container sidewall; and the seal ring comprises:

an outer sidewall comprising:

an arcuate portion for interfacing with a corresponding semi-circular bead of a sidewall of a container in the attached configuration;

an outer lip defining an annular channel having an upper closed end and a lower open end, the upper closed end being closer to the top of the container than the lower open end when the seal ring is in the attached configuration; and a seal ring protrusion for engaging with the semi-circular bead in the attached configuration, the seal ring protrusion opposite an undercut surface of the annular channel;

a bottom surface extending from an inner sidewall toward the outer sidewall;

the lower seal structure, wherein the lower seal structure is configured to engage with the u-shaped crevice of the container and comprises:

a lower portion of the outer sidewall;

a cavity defined by a bottom structure of the lower portion of the outer sidewall, wherein the cavity comprises:

a first surface interfacing with a surface of the lower portion of the outer sidewall, the first surface extending at least partially in a vertical direction parallel to the central vertical axis;

a second surface forming a rounded transition to the bottom surface, the second surface extending at least partially in the vertical direction, wherein at least a portion of the second surface faces at least a portion of the first surface; and an upper interior surface extending at least partially in a radial direction, the upper interior surface having a radially outermost edge intersecting the first surface and a radially innermost edge intersecting the second surface, when the seal ring is in the attached configuration with respect to the container, the radial axis simultaneously intersects (i) the first crevice sidewall of the container, (ii) the second crevice sidewall of the container, iii) the portion of the interior surface of the container sidewall, (iv) the crevice arm of the container, (v) a portion of an exterior surface of the container sidewall, (vi) the at least a portion of the first surface of the seal ring, (vii) the at least a portion of the second surface of the seal ring, and (viii) the bottom surface of the seal ring; and a latch portion defined by the lower portion of the outer sidewall and the cavity, the latch portion projecting outwardly from the seal ring.

2. The container assembly of claim 1, wherein the bottom surface slopes radially outwardly and downwardly toward the bottom of the container when the seal ring is in the attached configuration, at an angle between 100 degrees and 130 degrees from the inner sidewall.

3. The container assembly of claim 2, wherein the inner sidewall comprises a ring bead for engaging with a corresponding component on a container lid, wherein the ring bead protrudes substantially perpendicularly to the inner sidewall.

4. The container assembly of claim 3, wherein the ring bead is trapezoidal in shape and further comprises:

a front surface, wherein the front surface is parallel to an interior surface of the inner sidewall;

a top surface, wherein the top surface slopes downwardly toward the bottom of the container when the seal ring is in the attached configuration, from the interior surface of the inner sidewall to the front surface; and a bottom surface, wherein the bottom surface slopes downwardly toward the bottom of the container when the seal ring is in the attached configuration, from the front surface to the interior surface of the inner sidewall.

5. The container assembly of claim 4, wherein a distance between the seal ring protrusion and the undercut surface is between 0.25 cm and 1.5 cm.

6. The container assembly of claim 5, wherein the annular channel, the seal ring protrusion, the arcuate portion, and the lower seal structure seal the seal ring with the container in the attached configuration.

7. The container assembly of claim 1, wherein:

the u-shaped crevice is upwardly open toward the top of the container, the container comprises a container sidewall having a lower portion and an upper portion, at least some of the upper portion is configured to engage with at least some of the outer sidewall of the seal ring when the seal ring is in the attached configuration with respect to the container, the ledge is disposed between the lower portion and the upper portion, the container sidewall has a first thickness at a location within the lower portion and a second thickness at a location of the ledge, the second thickness being greater than the first thickness, and the container sidewall gradually increases in thickness from the first thickness to the second thickness.

8. The container assembly of claim 1, wherein when the seal ring is in the attached configuration with respect to the container, the cavity of the seal ring at least partially receives the crevice arm of the container and the u-shaped crevice of the container at least partially receives the latch portion of the seal ring to thereby form an interlocking seal between the seal ring and the container.

9. A container assembly comprising:

a container and a seal ring configured to attach to the container in an attached configuration, wherein:

the container comprises:

a u-shaped crevice that is (i) internally located within the container, (ii) upwardly open toward a top opening of the container, and (iii) configured to engage with at least a portion of a lower seal structure of the seal ring; and0 a crevice arm positioned radially inward from the u-shaped crevice, the crevice arm projecting from a sidewall of the container;

the seal ring comprises:

an outer sidewall comprising:

an arcuate portion for interfacing with a corresponding semi-circular bead of a sidewall of a container in the attached configuration;

an outer lip defining an annular channel having an upper closed end and a lower open end, the upper closed end being closer to the top of the container than the lower open end when the seal ring is in the attached configuration; and a seal ring protrusion for engaging with the semi-circular bead in the attached configuration, the seal ring protrusion opposite an undercut surface of the annular channel;

an inner sidewall comprising a ring bead for engaging with a corresponding component on a container lid;

a floor extending from a first intersection between the floor and the inner sidewall to a second intersection between the floor and the outer sidewall;

the lower seal structure, wherein the lower seal structure is configured to engage with the corresponding u-shaped crevice on the container and comprises:

a lower portion of the outer sidewall;

a cavity defined by a bottom structure of the lower portion of the outer sidewall, wherein the cavity comprises:

a first surface interfacing with a surface of the lower portion of the outer sidewall;

a second surface forming a rounded transition to an underside of the bottom structure; and an upper interior surface extending between the first surface and the second surface, wherein the cavity has a radially innermost edge that is bounded by a bottom surface that extends along at least a portion of the floor; and a latch portion defined by the lower portion of the outer sidewall and the cavity; and when the seal ring is in the attached configuration:

the cavity of the seal ring at least partially receives the crevice arm of the container and the u-shaped crevice of the container at least partially receives the latch portion of the seal ring to thereby form an interlocking seal between the container and the lower seal structure of the seal ring; and a radial axis parallel to a bottom of the container simultaneously intersects the cavity of the seal ring, the crevice arm of the container, the u-shaped crevice of the container, the latch portion of the seal ring, and the bottom surface of the seal ring.

10. The container assembly of claim 9, wherein a width of the cavity is between 0.75 cm and 1.5 cm.

11. The container assembly of claim 10, wherein the bottom surface slopes radially outwardly and downwardly toward the bottom of the container when the seal ring is in the attached configuration, at an angle between 100 degrees and 130 degrees from the inner sidewall.

12. The container assembly of claim 11, wherein the ring bead protrudes substantially perpendicularly to the inner sidewall.

13. The container assembly of claim 12, wherein the ring bead is trapezoidal in shape and further comprises:

a front surface, wherein the front surface is parallel to an interior surface of the inner sidewall;

a top surface, wherein the top surface slopes downwardly toward the bottom of the container when the seal ring is in the attached configuration, from the interior surface of the inner sidewall to the front surface; and a bottom surface, wherein the bottom surface slopes downwardly toward the bottom of the container when the seal ring is in the attached configuration, from the front surface to the interior surface of the inner sidewall.

14. The container assembly of claim 13, wherein a distance between the seal ring protrusion and the undercut surface is between 0.25 cm and 1.5 cm.

15. The container assembly of claim 14, wherein the annular channel, the seal ring protrusion, the arcuate portion, and the lower seal structure seal the seal ring with the container in the attached configuration.

16. The container assembly of claim 15, wherein the seal ring is plastic.

17. A container comprising:

a container body comprising a bottom, an uppermost end opposite the bottom and having a top opening, and an external wall extending from the bottom to the uppermost end and defining an interior cavity, the external wall comprising:

an exterior wall surface;

a container rim area proximate the uppermost end and comprising:

a latch surface extending outwardly from the exterior wall surface; and a semi-circular bead formed by an interior wall surface; and a ledge area below the container rim area, the ledge area integrally formed with the external wall and defining a u-shaped crevice that is open in a generally upward direction toward the uppermost end of the container body and a container body arm for engaging with a corresponding lower seal structure of a seal ring, the container body arm extending at least partially in the generally upward direction toward the uppermost end of the container body; and the seal ring comprising:

an outer sidewall comprising:

an arcuate portion for interfacing with the semi-circular bead of the interior wall surface of the container body when the seal ring is in an attached configuration with respect to the container body; and a seal ring protrusion for engaging with the semi-circular bead in the attached configuration;

an inner sidewall forming a seal structure for sealing the interior cavity of the container with a lid; and the lower seal structure for engaging with the u-shaped crevice on the container body and comprising:

a cavity having a radially innermost edge that is bounded by a bottom surface extending from the radially innermost edge to the inner sidewall; and a latch portion defined by the outer sidewall and the cavity, wherein when the seal ring and the container body are in the attached configuration:

the u-shaped crevice, the container body arm, the cavity, and the latch portion combine to form an interlocking seal between the container body and the lower seal structure of the seal ring; and each of (i) at least a portion of a radially outward wall surface of the u-shaped crevice, (ii) at least a portion of a radially inward wall surface of the u-shaped crevice, (iii) at least a portion of the container body arm, (iv) at least a portion of a radially outward wall surface of the cavity, (v) at least a portion of a radially inward wall surface of the cavity, (vi) at least a portion of the latch portion, and (viii) the bottom surface of the seal ring is intersected by a common radial axis that is perpendicular to a central vertical axis that passes through a center of the bottom of the container body, a center of the uppermost end of the container body, and a center of the seal ring.

18. The container of claim 17, wherein:

the arcuate portion of the outer sidewall comprises a first thickness; and a lower portion of the outer sidewall comprises a second thickness greater than the first thickness of the arcuate portion of the outer sidewall, the lower portion of the sidewall being closer to the bottom of the container body than the arcuate portion when the seal ring is in the attached configuration.

19. The container of claim 18, wherein:

the seal ring comprises an outer lip defining an annular channel having an upper closed end and a lower open end, the upper closed end being closer to the uppermost end of the container body than the lower open end when the seal ring is in the attached configuration; and the seal ring protrusion is configured to engage with the semi-circular bead in the attached configuration, the seal ring protrusion being opposite an undercut surface of the annular channel.

20. The container of claim 19, wherein the inner sidewall of the seal ring comprises a ring bead for engaging with a corresponding component on the lid to seal the interior cavity of the container.

* * * * *